United States Patent
Yoon et al.

(10) Patent No.: US 9,814,024 B2
(45) Date of Patent: *Nov. 7, 2017

(54) ESTABLISHING ADDITIONAL REVERSE LINK CARRIERS IN MULTI-CARRIER WIRELESS SYSTEMS

(71) Applicant: LG ELECTRONICS INC., Seoul (KR)

(72) Inventors: Young C. Yoon, San Diego, CA (US); Li-Hsiang Sun, San Diego, CA (US); Suk Woo Lee, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 128 days.

This patent is subject to a terminal disclaimer.

(21) Appl. No.: 13/912,118

(22) Filed: Jun. 6, 2013

(65) Prior Publication Data

US 2013/0272240 A1    Oct. 17, 2013

Related U.S. Application Data

(63) Continuation of application No. 13/365,170, filed on Feb. 2, 2012, now Pat. No. 8,462,739, which is a (Continued)

(51) Int. Cl.
*H04W 72/04* (2009.01)
*H04W 52/12* (2009.01)
(Continued)

(52) U.S. Cl.
CPC ....... *H04W 72/0406* (2013.01); *H04W 52/12* (2013.01); *H04W 52/146* (2013.01);
(Continued)

(58) Field of Classification Search
CPC ......... H04W 72/0406; H04W 72/0413; H04W 72/042; H04W 52/146; H04W 52/248;
(Continued)

(56) References Cited

U.S. PATENT DOCUMENTS

| 5,896,411 A | 4/1999 | Ali et al. |
|---|---|---|
| 6,201,972 B1 * | 3/2001 | Hamabe ............... H04W 16/10 455/447 |

(Continued)

FOREIGN PATENT DOCUMENTS

| CN | 1371219 | 9/2002 |
|---|---|---|
| CN | 1421111 | 5/2003 |

(Continued)

OTHER PUBLICATIONS

Jianmin, L. et al.: "Initial Power Setting of Additional Reverse Carriers", 3GPP2 TSG-C, C30-20050816-xxx [online], Aug. 16, 2005, 14 pages.

(Continued)

*Primary Examiner* — Candal Elpenord
*Assistant Examiner* — Ricardo Castaneyra
(74) *Attorney, Agent, or Firm* — Lee Hong Degerman Kang Waimey

(57) ABSTRACT

A method and apparatus for reliably and quickly establishing multiple reverse links in multi-carrier wireless networks is provided. Signaling channels are established on an existing forward link in order to transmit reverse link power control bits and the acknowledgment indications.

8 Claims, 19 Drawing Sheets

Related U.S. Application Data continuation of application No. 12/968,940, filed on Dec. 15, 2010, now Pat. No. 8,184,600, which is a continuation of application No. 11/534,178, filed on Sep. 21, 2006, now Pat. No. 7,953,048.

(60) Provisional application No. 60/719,407, filed on Sep. 21, 2005.

(51) Int. Cl.

| | | |
|---|---|---|
| *H04W 52/14* | (2009.01) | |
| *H04W 52/24* | (2009.01) | |
| *H04W 52/26* | (2009.01) | |
| *H04W 76/02* | (2009.01) | |
| *H04L 27/26* | (2006.01) | |
| *H04W 52/50* | (2009.01) | |
| *H04W 52/54* | (2009.01) | |
| *H04W 76/04* | (2009.01) | |

(52) U.S. Cl.
CPC ....... *H04W 52/241* (2013.01); *H04W 52/247* (2013.01); *H04W 52/248* (2013.01); *H04W 52/267* (2013.01); *H04W 76/025* (2013.01); *H04L 27/2601* (2013.01); *H04W 52/50* (2013.01); *H04W 52/54* (2013.01); *H04W 76/04* (2013.01); *H04W 76/046* (2013.01); *Y02B 60/50* (2013.01)

(58) Field of Classification Search
CPC . H04W 52/14; H04W 52/143; H04W 52/247; H04W 52/12; H04W 52/50; H04W 76/025; H04W 52/267; H04W 52/241; H04W 52/54; H04W 76/04; H04W 76/046; H04L 27/2601; Y02B 60/50
See application file for complete search history.

(56) References Cited

U.S. PATENT DOCUMENTS

| | | |
|---|---|---|
| 6,442,155 B1 | 8/2002 | Suk et al. |
| 7,149,190 B1 | 12/2006 | Li et al. |
| 7,585,780 B2 | 9/2009 | Kim |
| 7,684,358 B2 | 3/2010 | Kim et al. |
| 2001/0011011 A1 | 8/2001 | Kosugi |
| 2003/0054812 A1 | 3/2003 | Hunzinger |
| 2003/0108013 A1* | 6/2003 | Hwang et al. ................ 370/335 |
| 2005/0053036 A1 | 3/2005 | Takeda |
| 2006/0040619 A1 | 2/2006 | Cho et al. |
| 2007/0019589 A1 | 1/2007 | Attar et al. |
| 2007/0042798 A1 | 2/2007 | Chen et al. |
| 2007/0066340 A1 | 3/2007 | Yoon et al. |
| 2011/0085485 A1 | 4/2011 | Yoon et al. |
| 2012/0127944 A1 | 5/2012 | Yoon et al. |

FOREIGN PATENT DOCUMENTS

| | | |
|---|---|---|
| EP | 0899923 | 3/1999 |
| EP | 1367739 | 12/2003 |
| EP | 1455549 | 9/2004 |
| WO | 01/60106 | 8/2001 |
| WO | 01/78440 | 10/2001 |
| WO | 02/093952 | 11/2002 |
| WO | 2004/045228 | 5/2004 |
| WO | 2004/073205 | 8/2004 |
| WO | 2004/077726 | 9/2004 |

OTHER PUBLICATIONS

Attar et al.: "Multi-Carrier DO Initial Transmit Power for Secondary Reverse Link Carriers," 3GPP2 meeting, Conference Call, Sep. 2005, 4 pages.

Sung Han Park et al., "The Research about the Modulator Algorithms of the CDMA System for the Mobile Phone," Nov. 1993, 113 pages.

\* cited by examiner

CDMA SPREADING AND DESPREADING

CDMA SPREADING AND DESPREADING USING MULTIPLE SPREADING SEQUENCES

CDMA 2000 CALL PROCESSING OVERVIEW

CDMA 2000 INITIALIZATION STATE

SYSTEM ACCESS STATE

FIG. 7
COMPARISON OF CDMA2000 FOR 1x AND 1xEV-DO
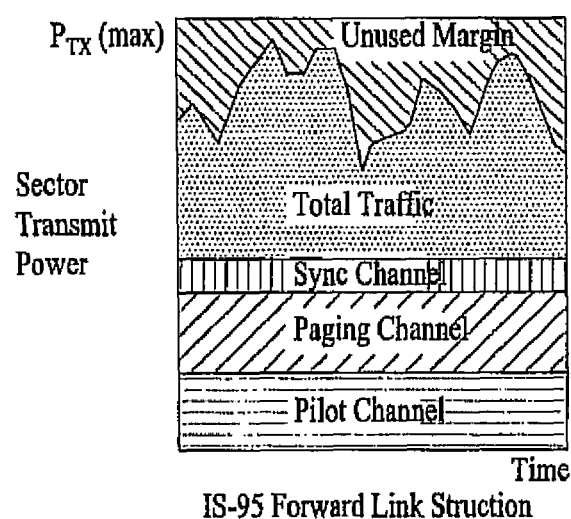
IS-95 Forward Link Struction
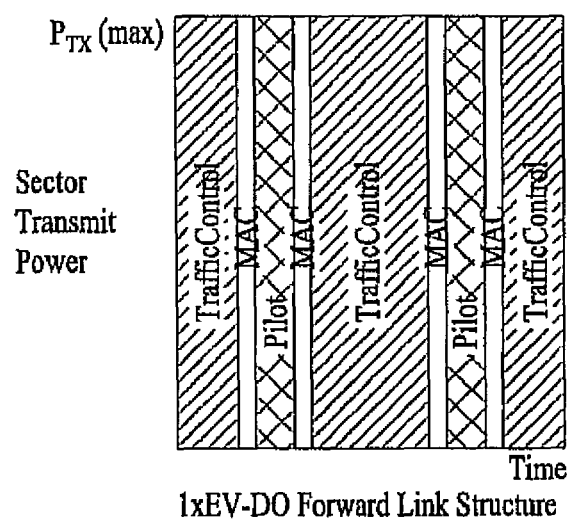
1xEV-DO Forward Link Structure 1xEV-DO DEFAULT PROTOCOL 1xEV-DO NON-DEFAULT PROTOCOL 1xEV-DO SESSION ESTABLISHMENT 1xEV-DO CONNECTION LAYER PROTOCOLS 1xEV-DO ACK/NAK OPERATION 1xEV-DO ACK CHANNEL IN REVERSE LINK

MOBILE STATION/ACCESS TERMINAL

ESTABLISHING ADDITIONAL REVERSE LINK CARRIERS IN MULTI-CARRIER WIRELESS SYSTEMS

CROSS-REFERENCE TO RELATED APPLICATIONS

This application is a continuation of U.S. patent application Ser. No. 13/365,170, filed on Feb. 2, 2012, now U.S. Pat. No. 8,462,739, which is a continuation of U.S. patent application Ser. No. 12/968,940, filed on Dec. 15, 2010, now U.S. Pat. No. 8,184,600, which is a continuation of U.S. patent application Ser. No. 11/534,178, filed Sep. 21, 2006, now U.S. Pat. No. 7,953,048, which claims the benefit of U.S. Provisional Application No. 60/719,407 filed on Sep. 21, 2005, the contents of which are all incorporated by reference herein in their entirety.

BACKGROUND OF THE INVENTION

Field of the Invention

This invention is related to integrated multi-carrier systems and, in particular, to a method and apparatus for reliably and quickly establishing multiple reverse links in multi-carrier wireless networks.

Description of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G refers to analog phone systems known as AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3 G communication systems are conceptually similar to each other with some significant differences.

Referring to FIG. 1, a wireless communication network architecture) is illustrated. A subscriber uses a mobile station (MS) 2 to access network services. The MS 2 may be a portable communications unit, such as a hand-held cellular phone, a communication unit installed in a vehicle, or a fixed-location communications unit.

The electromagnetic waves for the MS 2 are transmitted by the Base Transceiver System (BTS) 3 also known as node B. The BTS 3 consists of radio devices such as antennas and equipment for transmitting and receiving radio waves. The BS 6 Controller (BSC) 4 receives the transmissions from one or more BTS's. The BSC 4 provides control and management of the radio transmissions from each BTS 3 by exchanging messages with the BTS and the Mobile Switching Center (MSC) 5 or Internal IP Network. The BTS's 3 and BSC 4 are part of the BS 6 (BS) 6.

The BS 6 exchanges messages with and transmits data to a Circuit Switched Core Network (CSCN) 7 and Packet Switched Core Network (PSCN) 8. The CSCN 7 provides traditional voice communications and the PSCN 8 provides Internet applications and multimedia services.

The Mobile Switching Center (MSC) 5 portion of the CSCN 7 provides switching for traditional voice communications to and from a MS 2 and may store information to support these capabilities. The MSC 2 may be connected to one of more BS's 6 as well as other public networks, for example a Public Switched Telephone Network (PSTN) (not shown) or Integrated Services Digital Network (ISDN) (not shown). A Visitor Location Register (VLR) 9 is used to retrieve information for handling voice communications to or from a visiting subscriber. The VLR 9 may be within the MSC 5 and may serve more than one MSC.

A user identity is assigned to the Home Location Register (HLR) 10 of the CSCN 7 for record purposes such as subscriber information, for example Electronic Serial Number (ESN), Mobile Directory Number (MDR), Profile Information, Current Location, and Authentication Period. The Authentication Center (AC) 11 manages authentication information related to the MS 2. The AC 11 may be within the HLR 10 and may serve more than one HLR. The interface between the MSC 5 and the HLR/AC 10, 11 is an IS-41 standard interface 18.

The Packet Data Serving Node (PDSN) 12 portion of the PSCN 8 provides routing for packet data traffic to and from MS 2. The PDSN 12 establishes, maintains, and terminates link layer sessions to the MS 2's 2 and may interface with one of more BS 6 and one of more PSCN 8.

The Authentication, Authorization and Accounting (AAA) 13 Server provides Internet Protocol authentication, authorization and accounting functions related to packet data traffic. The Home Agent (HA) 14 provides authentication of MS 2 IP registrations, redirects packet data to and from the Foreign Agent (FA) 15 component of the PDSN 8, and receives provisioning information for users from the AAA 13. The HA 14 may also establish, maintain, and terminate secure communications to the PDSN 12 and assign a dynamic IP address. The PDSN 12 communicates with the AAA 13, HA 14 and the Internet 16 via an Internal IP Network.

There are several types of multiple access schemes, specifically Frequency Division Multiple Access (FDMA), Time Division Multiple Access (TDMA) and Code Division Multiple Access (CDMA). In FDMA, user communications are separated by frequency, for example, by using 30 KHz channels. In TDMA, user communications are separated by frequency and time, for example, by using 30 KHz channels with 6 timeslots. In CDMA, user communications are separated by digital code.

In CDMA, All users on the same spectrum, for example, 1.25 MHz. Each user has a unique digital code identifier and the digital codes separate users to prevent interference.

A CDMA signal uses many chips to convey a single bit of information. Each user has a unique chip pattern, which is essentially a code channel. In order to recover a bit, a large number of chips are integrated according to a user's known chip pattern. Other user's code patterns appear random and are integrated in a self-canceling manner and, therefore, do not disturb the bit decoding decisions made according to the user's proper code pattern.

Input data is combined with a fast spreading sequence and transmitted as a spread data stream. A receiver uses the same spreading sequence to extract the original data. FIG. 2A illustrates the spreading and de-spreading process. As illustrated in FIG. 2B, multiple spreading sequences may be combined to create unique, robust channels.

A Walsh code is one type of spreading sequence. Each Walsh code is 64 chips long and is precisely orthogonal to all other Walsh codes. The codes are simple to generate and small enough to be stored in Read Only Memory (ROM).

A short PN code is another type of spreading sequence. A short PN Code consists of two PN sequences (I and Q), each of which is 32,768 chips long and is generated in similar, but differently tapped 15-bit shift registers. The two sequences scramble the information on the I and Q phase channels.

A long PN code is another type of spreading sequence. A long PN Code s generated in a 42-bit register and is more than 40 days long, or about $4 \times 10^{13}$ chips long. Due to its length, a long PN code cannot be stored in ROM in a terminal and, therefore, is generated chip-by-chip.

Each MS 2 codes its signal with the PN long code and a unique offset, or public long code mask, computed using the long PN code ESN of 32-bits and 10 bits set by the system. The public long code mask produces a unique shift. Private long code masks may be used to enhance privacy. When integrated over as short a period as 64 chips, MS 2 with different long PN code offsets will appear practically orthogonal.

CDMA communication uses forward channels and reverse channels. A forward channel is utilized for signals from a BTS 3 to a MS 2 and a reverse channel is utilized for signals from a MS to a BTS.

A forward channel uses its specific assigned Walsh code and a specific PN offset for a sector, with one user able to have multiple channel types at the same time. A forward channel is identified by its CDMA RF carrier frequency, the unique short code PN offset of the sector and the unique Walsh code of the user. CDMA forward channels include a pilot channel, sync channel, paging channels and traffic channels.

The pilot channel is a "structural beacon" which does not contain a character stream, but rather is a timing sequence used for system acquisition and as a measurement device during handoffs. A pilot channel uses Walsh code 0.

The sync channel carries a data stream of system identification and parameter information used by MS 2 during system acquisition. A sync channel uses Walsh code 32.

There may be from one to seven paging channels according to capacity requirements. Paging channels carry pages, system parameter information and call setup orders. Paging channels use Walsh codes 1-7.

The traffic channels are assigned to individual users to carry call traffic. Traffic channels use any remaining Walsh codes subject to overall capacity as limited by noise.

A reverse channel is utilized for signals from a MS 2 to a BTS 3 and uses a Walsh code and offset of the long PN sequence specific to the MS, with one user able to transmit multiple types of channels simultaneously. A reverse channel is identified by its CDMA RF carrier frequency and the unique long code PN offset of the individual MS 2. Reverse channels include traffic channels and access channels.

Individual users use traffic channels during actual calls to transmit traffic to the BTS 3. A reverse traffic channel is basically a user-specific Public or Private Long Code Mask and there are as many reverse traffic channels as there are CDMA terminals.

An MS 2 not yet involved in a call uses access channels to transmit registration requests, call setup requests, page responses, order responses and other signaling information. An access channel is basically a public long code offset unique to a BTS 3 sector. Access channels are paired with paging channels, with each paging channel having up to 32 access channels.

CDMA communication provides many advantages. Some of the advantages are variable rate vocoding and multiplexing, forward power control, use of RAKE receivers and soft handoff.

CDMA allows the use of variable rate vocoders to compress speech, reduce bit rate and greatly increase capacity. Variable rate vocoding provides full bit rate during speech, low data rates during speech pauses, increased capacity and natural sound. Multiplexing allows voice, signaling and user secondary data to be mixed in CDMA frames.

By utilizing forward power control, the BTS 3 continually reduces the strength of each user's forward baseband chip stream. When a particular MS 2 experiences errors on the forward link, more energy is requested and a quick boost of energy is supplied after which the energy is again reduced.

Reverse power control uses three methods in tandem to equalize all terminal signal levels at the BTS 3. Reverse open loop power control is characterized by the MS 2 adjusting power up or down based on a received BTS 3 signal (AGC). Reverse closed loop power control is characterized by the BTS 3 adjusting power up or down by 1 db at a rate of 800 times per second. Reverse outer loop power control is characterized by the BSC 4 adjusting a BTS 3 set point when the BSC has Forward Error Correction (FER) trouble hearing the MS 2.

The actual RF power output of the MS 2 transmitter (TXPO), including the combined effects of open loop power control from receiver AGC and closed loop power control by the BTS 3, cannot exceed the maximum power of the MS, which is typically +23 dbm. Reverse power control is performed according to the equation "TXPO=-($RX_{dbm}$)-C+TXGA," where "TXGA" is the sum of all Closed Loop power control commands from the BTS 3 since the beginning of a call and "C" is +73 for 800 MHZ systems and +76 for 1900 MHz systems.

Using a RAKE receiver allows a MS 2 to use the combined outputs of the three traffic correlators, or "RAKE fingers," every frame. Each RAKE finger can independently recover a particular PN offset and Walsh code. The fingers may be targeted on delayed multipath reflections of different BTS's 3, with a searcher continuously checking pilot signals.

The MS 2 drives soft handoff. The MS 2 continuously checks available pilot signals and reports to the BTS 3 regarding the pilot signals it currently sees. The BTS 3 assigns up to a maximum of six sectors and the MS 2 assigns its fingers accordingly. AI messages are sent by dim-and-burst without muting. Each end of the communication link chooses the best configuration on a frame-by-frame basis, with handoff transparent to users.

A cdma2000 system is a third-generation (3G) wideband; spread spectrum radio interface system that uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

FIG. 3 illustrates a data link protocol architecture layer 20 for a cdma2000 wireless network. The data link protocol architecture layer 20 includes an Upper Layer 60, a Link Layer 30 and a Physical Layer 21.

The Upper Layer 60 includes three sublayers; a Data Services sublayer 61; a Voice Services sublayer 62 and a Signaling Services sublayer 63. Data Services 61 are services that deliver any form of data on behalf of a mobile end user and include packet data applications such as IP service, circuit data applications such as asynchronous fax and B-ISDN emulation services, and SMS. Voice Services 62 include PSTN access, mobile-to-mobile voice services, and Internet telephony. Signaling 63 controls all aspects of mobile operation.

The Signaling Services sublayer 63 processes all messages exchanged between the MS 2 and BS 6. These messages control such functions as call setup and teardown, handoffs, feature activation, system configuration, registration and authentication.

In the MS 2, the Signaling Services sublayer 63 is also responsible for maintaining call process states, specifically a MS 2 Initialization State, MS 2 Idle State, System Access State and MS 2 Control on Traffic Channel State.

The Link Layer 30 is subdivided into the Link Access Control (LAC) sublayer 32 and the Medium Access Control (MAC) sublayer 31. The Link Layer 30 provides protocol support and control mechanisms for data transport services and performs the functions necessary to map the data transport needs of the Upper layer 60 into specific capabilities and characteristics of the Physical Layer 21. The Link Layer 30 may be viewed as an interface between the Upper Layer 60 and the Physical Layer 20.

The separation of MAC 31 and LAC 32 sublayers is motivated by the need to support a wide range of Upper Layer 60 services and the requirement to provide for high efficiency and low latency data services over a wide performance range, specifically from 1.2 Kbps to greater than 2 Mbps. Other motivators are the need for supporting high Quality of Service (QoS) delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer 32 manages point-to point communication channels between upper layer 60 entities and provides framework to support a wide range of different end-to-end reliable Link Layer 30 protocols.

The LAC sublayer 32 provides correct delivery of signaling messages. Functions include assured delivery where acknowledgement is required, unassured delivery where no acknowledgement is required, duplicate message detection, address control to deliver a message to an individual MS 2, segmentation of messages into suitable sized fragments for transfer over the physical medium, reassembly and validation of received messages and global challenge authentication.

The MAC sublayer 31 facilitates complex multimedia, multi-services capabilities of 3G wireless systems with QoS management capabilities for each active service. The MAC sublayer 31 provides procedures for controlling the access of packet data and circuit data services to the Physical Layer 21, including the contention control between multiple services from a single user, as well as between competing users in the wireless system. The MAC sublayer 31 also performs mapping between logical channels and physical channels, multiplexes data from multiple sources onto single physical channels and provides for reasonably reliable transmission over the Radio Link Layer using a Radio Link Protocol (RLP) 33 for a best-effort level of reliability. Signaling Radio Burst Protocol (SRBP) 35 is an entity that provides connectionless protocol for signaling messages. Multiplexing and QoS Control 34 is responsible for enforcement of negotiated QoS levels by mediating conflicting requests from competing services and the appropriate prioritization of access requests.

The Physical Layer 21 is responsible for coding and modulation of data transmitted over the air. The Physical Layer 21 conditions digital data from the higher layers so that the data may be transmitted over a mobile radio channel reliably.

The Physical Layer 21 maps user data and signaling, which the MAC sublayer 31 delivers over multiple transport channels, into a physical channels and transmits the information over the radio interface. In the transmit direction, the functions performed by the Physical Layer 21 include channel coding, interleaving, scrambling, spreading and modulation. In the receive direction, the functions are reversed in order to recover the transmitted data at the receiver.

FIG. 4 illustrates an overview of call processing. Processing a call includes pilot and sync channel processing, paging channel processing, access channel processing and traffic channel processing.

Pilot and sync channel processing refers to the MS 2 processing the pilot and sync channels to acquire and synchronize with the CDMA system in the MS 2 Initialization State. Paging channel processing refers to the MS 2 monitoring the paging channel or the forward common control channel (F-CCCH) to receive overhead and mobile-directed messages from the BS 6 in the Idle State. Access channel processing refers to the MS 2 sending messages to the BS 6 on the access channel or the Enhanced access channel in the System Access State, with the BS 6 always listening to these channels and responding to the MS on either a paging channel or the F-CCCH. Traffic channel processing refers to the BS 6 and MS 2 communicating using dedicated forward and reverse traffic channels in the MS 2 control on Traffic Channel State, with the dedicated forward and reverse traffic channels carrying user information, such as voice and data.

FIG. 5 illustrates the Initialization State of a MS 2. The Initialization State includes a System Determination Substate, Pilot Channel Acquisition, Sync Channel Acquisition, a Timing Change Substate and a Mobile Station Idle State.

System Determination is a process by which the MS 2 decides from which system to obtain service. The process could include decisions such as analog versus digital, cellular versus PCS, and A carrier versus B carrier. A custom selection process may control System determination. A service provider using a redirection process may also control System Determination. After the MS 2 selects a system, it must determine on which channel within that system to search for service. Generally the MS 2 uses a prioritized channel list to select the channel.

Pilot Channel Acquisition is a process whereby the MS 2 first gains information regarding system timing by searching for usable pilot signals. Pilot channels contain no information, but the MS 2 can align its own timing by correlating with the pilot channel. Once this correlation is completed, the MS 2 is synchronized with the sync channel and can read a sync channel message to further refine its timing. The MS 2 is permitted to search up to 15 seconds on a single pilot channel before it declares failure and returns to System Determination to select either another channel or another system. The searching procedure is not standardized, with the time to acquire the system depending on implementation.

FIG. 6 illustrates the System Access State. The first step in the system access process is to update overhead information to ensure that the MS 2 is using the correct Access channel parameters, such as initial power level and power step increments. A MS 2 randomly selects an access channel and transmits without coordination with the BS 6 or other MS.

The Multiplexing and QoS Control sublayer 34 has both a transmitting function and a receiving function. The transmitting function combines information from various sources, such as Data Services 61, Signaling Services 63 or Voice Services 62, and forms Physical layer SDUs and PDCHCF SDUs for transmission. The receiving function separates the information contained in Physical Layer 21 and PDCHCF SDUs and directs the information to the correct entity, such as Data Services 61, Upper Layer Signaling 63 or Voice Services 62.

The Multiplexing and QoS Control sublayer 34 operates in time synchronization with the Physical Layer 21. If the Physical Layer 21 is transmitting with a non-zero frame offset, the Multiplexing and QoS Control sublayer 34 delivers Physical Layer SDUs for transmission by the Physical Layer at the appropriate frame offset from system time.

The Multiplexing and QoS Control sublayer 34 delivers a Physical Layer 21 SDU to the Physical Layer using a physical-channel specific service interface set of primitives. The Physical Layer 21 delivers a Physical Layer SDU to the Multiplexing and QoS Control sublayer 34 using a physical channel specific Receive Indication service interface operation.

The SRBP Sublayer 35 includes the Sync Channel, Forward Common Control Channel, Broadcast Control Channel, Paging Channel and Access Channel Procedures.

The LAC Sublayer 32 provides services to Layer 3 60. SDUs are passed between Layer 3 60 and the LAC Sublayer 32. The LAC Sublayer 32 provides the proper encapsulation of the SDUs into LAC PDUs, which are subject to segmentation and reassembly and are transferred as encapsulated PDU fragments to the MAC Sublayer 31.

Processing within the LAC Sublayer 32 is done sequentially, with processing entities passing the partially formed LAC PDU to each other in a well-established order. SDUs and PDUs are processed and transferred along functional paths, without the need for the upper layers to be aware of the radio characteristics of the physical channels. However, the upper layers could be aware of the characteristics of the physical channels and may direct Layer 2 30 to use certain physical channels for the transmission of certain PDUs.

A 1×EV-DO system is optimized for packet data service and characterized by a single 1.25 MHz carrier ("1×") for Data Only or Data Optimized ("DO"). Furthermore, there is a peak data rate of 2.4 Mbps or 4.9152 Mbps on the Forward Link and 153.6 Kbps or 1.8432 Mbps on the Reverse Link. Moreover 1×EV-DO provides separated frequency bands and internetworking with a 1× System. FIG. 7 illustrates a comparison of cdma2000 for 1× and 1×EV-DO.

In a cdma2000 system, there are concurrent services, whereby voice and data are transmitted together at a maximum data rate of 614.4 kbps and 307.2 kbps in practice. An MS 2 communicates with the MSC 5 for voice calls and with the PDSN 12 for data calls. CDMA2000 is characterized by a fixed rate with variable power with a Walsh-code separated forward traffic channel.

In a 1×EV-DO system, the maximum data rate is 2.4 Mbps or 3.072 Mbps and there is no communication with the circuit-switched core network 7. 1×EV-DO is characterized by fixed power and a variable rate with a single forward channel that is time division multiplexed.

FIG. 8 illustrates a 1×EV-DO architecture forward link slot structure. In a 1×EV-DO system, a frame consists of 16 slots, with 600 slots/sec, and has a duration of 26.67 ms, or 32,768 chips. A single slot is 1.6667 ms long and has 2048 chips. A control/traffic channel has 1600 chips in a slot, a pilot channel has 192 chips in a slot and a MAC channel has 256 chips in a slot. A 1×EV-DO system facilitates simpler and faster channel estimation and time synchronization, FIG. 9 illustrates a 1×EV-DO system default protocol architecture. FIG. 10 illustrates a 1×EV-DO system non-default protocol architecture.

Information related to a session in a 1×EV-DO system includes a set of protocols used by an MS 2, or Access Terminal (AT), and a BS 6, or Access Network (AN), over an airlink, a Unicast Access Terminal Identifier (UATI), configuration of the protocols used by the AT and AN over the airlink and an estimate of the current AT location.

The Application Layer provides best effort, whereby the message is sent once, and reliable delivery, whereby the message can be retransmitted one or more times. The Steam Layer provides the ability to multiplex up to 4 (default) or 244 (non-default) application streams for one AT 2.

The Session Layer ensures the session is still valid and manages closing of session, specifies procedures for the initial UATI assignment, maintains AT addresses and negotiates/provisions the protocols used during the session and the configuration parameters for these protocols.

FIG. 11 illustrates the establishment of a 1×EV-DO session. As illustrated in FIG. 11, establishing a session includes address configuration, connection establishment, session configuration and exchange keys.

Address configuration refers to an Address Management protocol assigning a UATI and Subnet mask. Connection establishment refers to Connection Layer protocols setting up a radio link. Session configuration refers to a Session Configuration Protocol configuring all protocols. Exchange keys refers to a Key Exchange protocol in the Security Layer setting up keys for authentication.

A "session" refers to the logical communication link between the AT 2 and the RNC, which remains open for hours, with a default of 54 hours. A session lasts until the PPP session is active as well. Session information is controlled and maintained by the RNC in the AN 6.

When a connection is opened, the AT 2 can be assigned the forward traffic channel and is assigned a reverse traffic channel and reverse power control channel. Multiple connections may occur during single session. There are two connection states in a 1×EV-DO system, a closed connection and an open connection.

A closed connection refers to a state where the AT 2 is not assigned any dedicated air-link resources and communications between the AT and AN 6 are conducted over the access channel and the control channel. An open connection refers to a state where the AT 2 can be assigned the forward traffic channel, is assigned a reverse power control channel and a reverse traffic channel and communication between the AT 2 and AN 6 is conducted over these assigned channels as well as over the control channel.

The Connection Layer manages initial acquisition of the network, setting an open connection and closed connection and communications. Furthermore, the Connection Layer maintains an approximate AT 2 location in both the open connection and closed connection and manages a radio link between the AT 2 and the AN 6 when there is an open connection. Moreover, the Connection Layer performs supervision in both the open connection and closed connection, prioritizes and encapsulates transmitted data received from the Session Layer, forwards the prioritized data to the Security Layer and decapsulates data received from the Security Layer and forwards it to the Session Layer.

FIG. 12 illustrates Connection Layer Protocols. As illustrated in FIG. 12, the protocols include an Initialization State, an Idle State and a Connected State.

In the Initialization State, the AT 2 acquires the AN 6 and activates the initialization State Protocol. In the Idle State, a Closed Connection is initiated and the Idle State Protocol is activated. In the connected State, an open connection is initiated and the Connected State Protocol is activated.

The Initialization State Protocol performs actions associated with acquiring an AN 6. The Idle State Protocol performs actions associated with an AT 2 that has acquired an AN 6, but does not have an open connection, such as keeping track of the AT location using a Route Update Protocol. The Connected State Protocol performs actions associated with an AT 2 that has an open connection, such as managing the radio link between the AT and AN 6 and managing the procedures leading to a closed connection. The Route Update Protocol performs actions associated with keeping track of the AT 2 location and maintaining the radio link between the AT and AN 6. The Overhead Message Protocol broadcasts essential parameters, such as QuickConfig, SectorParameters and AccessParameters message, over the Control channel. The Packet Consolidation Protocol consolidates and prioritizes packets for transmission as a function of their assigned priority and the target channel as well as providing packet de-multiplexing on the receiver.

The Security Layer includes a key exchange function, authentication function and encryption function. The key exchange function provides the procedures followed by the AN 2 and AT 6 for authenticating traffic. The authentication function provides the procedures followed by the AN 2 and AT 6 to exchange security keys for authentication and encryption. The encryption function provides the procedures followed by the AN 2 and AT 6 for encrypting traffic.

The 1×EV-DO forward link is characterized in that no power control and no soft handoff are supported. The AN 6 transmits at constant power and the AT 2 requests variable rates on the forward link. Because different users may transmit at different times in TDM, it is difficult to implement diversity transmission from different BS's 6 that are intended for a single user.

In the MAC Layer, two types of messages originated from higher layers are transported across the physical layer, specifically a user data message and a signaling message. Two protocols are used to process the two types of messages, specifically a forward traffic channel MAC Protocol for the user data message and a control channel MAC Protocol, for the signaling message.

The Physical Layer 21 is characterized by a spreading rate of 1.2288 Mcps, a frame consisting of 16 slots and 26.67 ms, with a slot of 1.67 ms and 2048 chips. The forward link channel includes a pilot channel, a forward traffic channel or control channel and a MAC channel.

The pilot Channel is similar to the to the cdma2000Pilot channel in that it comprises all "0" information bits and Walsh-spreading with W0 with 192 chips for a slot.

The forward traffic channel is characterized by a data rate that varies from 38.4 kbps to 2.4576 Mbps or from 4.8 kbps to 4.9152 Mbps. Physical Layer packets can be transmitted in 1 to 16 slots and the transmit slots use 4-slot interlacing when more than one slot is allocated. If ACK is received on the reverse link ACK channel before all of the allocated slots have been transmitted, the remaining slots shall not be transmitted.

The control channel is similar to the sync channel and paging channel in cdma2000. The control channel is characterized by a period of 256 slots or 426.67 ms, a Physical Layer packet length of 1024 bits or 128, 256, 512 and 1024 bits and a data rate of 38.4 kbps or 76.8 kbps or 19.2 kbps, 38.4 kbps or 76.8 kbps.

The MAC channel provides a reverse activity (RA) channel, a reverse power control channel, a DRCLock channel, an ARQ channel and a pilot channel.

The Reverse Activity (RA) channel is used by the AN 6 to inform all ATs within its coverage area of the current activity on the reverse link and is a MAC channel with MAC Index 4. The RA channel carries reverse activity bits (RAB).

The AN 6 uses the Reverse Power Control (RPC) channel for power control of the AT's 2 reverse link transmissions. A reverse power control bit is transmitted through the RPC Channel.

The DRCLock channel prevents a situation where the DRC does not schedule an AT 2 for forward transmission and the AT continues to request service through the DRC if a sector cannot hear the DRC for the particular AT. If the DRCLock bit for the AT 2 is set, the AT stops sending the DRC to the sector.

The ARQ channel supports Reverse Link Hybrid-ARQ (H-ARQ), whereby remaining sub-packets are not transmitted if the AN 6 has resolved the Physical Layer packet. H-ARQ indicates whether the AN 6 successfully received the packet transmitted in a previous slot.

ACK/NAK facilitates an AT 2 receiving some of the data and verifying the checksum. FIG. 13 illustrates ACK/NAK operation in the forward link.

The 1×EV-DO reverse link is characterized in that the AN 6 can power control the reverse link by using reverse power control and more than one AN can receive the AT's 2 transmission via soft handoff. Furthermore, there is no TDM on the reverse link, which is channelized by Walsh code using a long PN code.

In the reverse link, two MAC Layer protocols are used to process two types of messages. A reverse traffic channel MAC protocol is used to process user data messages and an access channel MAC protocol is used to process signaling messages.

Using the reverse traffic channel MAC protocol, the AN 6 provides information to the AT 2 including BroadcastReverseRateLimit, UnicastReverseRateLimit, Reverse Activity Bit, Transition Probability matrix and Rate Parameters. Reverse link channels include reverse traffic channels and access channels.

Reverse traffic channels include a data channel, pilot channel, MAC channel and ACK channel. Primary and auxiliary pilot channels may be provided.

A Reverse Rate Indicator (RRI) is sent to the AN 6 every 26.67 ms or every 16 slots and indicates the data rate as a 3-bit RRI field or payload size of the data channel. The RRI may convey the sub-packet ID of the current transmission and include 6 bits of RRI symbols, specifically 4 bits for Payload Index and 2 bits for Sub-packet Index.

The AT 2 uses the ACK channel to inform the AN 6 whether a Physical Layer packet transmitted on the forward traffic channel has been received successfully. Specifically, the ACK bit is set to 0 indicates CRC OK and the ACK bit set to 1 indicates CRC Fail. FIG. 14 illustrates the use of the ACK channel in the reverse link.

The MAC channel further includes a Reverse Rate Indicator (RRI) channel, Data Rate Control (DRC) channel and Data Source Control (DSC) channel. Access channels include a pilot channel and data channel.

Conventional systems tend to be independent single-carrier systems with a single RL and single FL, such as FDD. Given that there exists at least one RL and one FL already established, conventional methods have disadvantages when establishing additional RLs.

The new RL carriers may be in adjacent carriers or non-adjacent carriers. The conventional methods used to establish the RL in a single-carrier system by using access probes could be used. However, a rather long delay would result for each new RL carrier. Furthermore, conventional methods for determining the initial transmission power of additional RL carriers provide only an estimate of the "correct" transmission power and the level of accuracy is uncertain.

Therefore, there is a need for a method and apparatus for reliably and quickly establishing multiple reverse links in multi-carrier wireless networks that can quickly and reliability bring the transmission power level to the "correct" level. The present invention addresses these and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention is directed to provide a method and apparatus for reliably and quickly establishing multiple reverse links in multi-carrier wireless networks. Specifically, the present invention is directed to a method and apparatus for reliably and quickly establishing multiple reverse links in multi-carrier wireless networks that can quickly and reliability bring the transmission power level to the "correct" level.

In one aspect of the present invention, a method of establishing additional reverse link carriers in a multi-carrier wireless communication system is provided. The method includes establishing a first communication link with a network by receiving data from the network via a first forward link carrier and transmitting data to the network via a first reverse link carrier, receiving a traffic channel assignment indicator for a second reverse link carrier via the first forward link carrier and receiving reverse link power control information for the second reverse link via the first forward link carrier, the reverse link power control information associated with controlling transmission power of the second reverse link carrier according to a channel quality of the first forward link.

It is contemplated that the method further includes transmitting an indicator to the network using an adjusted power level, the power level adjusted according to a predetermined step size in response to the reverse link power control information. It is further contemplated that an initial transmission power for transmitting the indicator is determined in response to at least one of a reverse link load and a channel correlation estimate between the first reverse link carrier and the second reverse link carrier.

It is contemplated that the indicator includes at least one of a pilot signal and a reverse rate indicator. It is further contemplated that the method further includes receiving a notification signal from the network via one of the first forward link carrier and a second forward link carrier, the notification signal indicating that the network has acquired the second reverse link carrier.

It is contemplated that the notification signal is received in one of a signaling message and a physical layer message. It is further contemplated that the first forward link carrier and the first reverse link carrier include a code division multiple access (CDMA) channel.

It is contemplated that the method further includes receiving a power-adjust signal from the network and transmitting another indicator at an adjusted power level, the power level adjusted according to a step size that is larger than the predetermined step size. It is further contemplated that the method further includes communicating packet data via the second reverse link carrier when the reverse link power control information received from the network is associated with decreasing a power level. Preferably, the method further includes communicating packet data via the second reverse link carrier when an acknowledgement signal is received from the network.

In another aspect of the present invention, a method of establishing additional reverse link carriers in a multi-carrier wireless communication system is provided. The method includes establishing a first communication link with a mobile terminal by transmitting data to the mobile terminal via a first forward link carrier and receiving data from the mobile terminal via a first reverse link carrier, transmitting a traffic channel assignment indicator for a second reverse link carrier via the first forward link carrier and transmitting reverse link power control information for the second reverse link via the first forward link carrier, the reverse link power control information associated with controlling transmission power of the second reverse link carrier according to a channel quality of the first forward link.

It is contemplated that the method further includes receiving an indicator from the mobile terminal, the indicator received at an adjusted power level, the power level adjusted according to a predetermined step size in response to the reverse link power control information. It is further contemplated that the indicator includes at least one of a pilot signal and a reverse rate indicator.

It is contemplated that the method further includes transmitting a notification signal to the mobile terminal via one of the first forward link carrier and a second forward link carrier, the notification signal indicating that the second reverse link carrier was acquired. It is further contemplated that the notification signal is transmitted in one of a signaling message and a physical layer message.

It is contemplated that the first forward link carrier and the first reverse link carrier comprise a code division multiple access (CDMA) channel. It is further contemplated that the method further includes transmitting a power-adjust signal to the mobile terminal and receiving another indicator at an adjusted power level, the power level adjusted according to a step size that is larger than the predetermined step size.

It is contemplated that the method further includes receiving packet data via the second reverse link carrier when the reverse link power control information transmitted to the mobile terminal is associated with decreasing a power level. It is further contemplated that the method further includes receiving packet data via the second reverse link carrier when an acknowledgement signal is transmitted to the mobile terminal.

In another aspect of the present invention, a method of establishing additional reverse link carriers in a multi-carrier wireless communication system is provided. The method includes establishing a first communication link with a network by receiving data from the network via a first forward link carrier and transmitting data to the network via a first reverse link carrier, receiving a traffic channel assignment indicator for a second reverse link carrier via the first forward link carrier, transmitting a channel quality indicator for a second forward link carrier to the network and receiving reverse link power control information for the second reverse link via the second forward link carrier, the reverse link power control information associated with controlling transmission power of the second reverse link carrier according to a channel quality of the first forward link.

It is contemplated that the channel quality indicator for the second forward link carrier is transmitted via the first reverse link carrier. It is further contemplated that the channel quality indicator for the second forward link carrier is transmitted via the second reverse link carrier.

It is contemplated that the method further includes transmitting another indicator to the network using an adjusted power level, the power level adjusted according to a predetermined step size in response to the reverse link power control information. It is further contemplated that an initial transmission power for transmitting the other indicator is determined in response to at least one of a reverse link load and a channel correlation estimate between the first reverse link carrier and the second reverse link carrier. Preferably, the reverse link power control information is determined by the network in response to comparing a measured signal to noise ratio of the indicator received from the mobile terminal and a predetermined value, wherein the predetermined value is adjusted when the network detects a null rate reverse rate indicator (RRI), when the reverse link power control information is associated with decreasing power level, or when the network decodes a reverse traffic channel received from the mobile terminal.

In another aspect of the present invention, a method of establishing additional reverse link carriers in a multi-carrier wireless communication system is provided. The method includes establishing a first communication link with a mobile terminal by transmitting data to the mobile terminal via a first forward link carrier and receiving data from the mobile terminal via a first reverse link carrier, transmitting a traffic channel assignment indicator for a second reverse link carrier via the first forward link carrier, receiving a channel quality indicator for a second forward link carrier from the mobile terminal and transmitting reverse link power control information for the second reverse link via the second forward link carrier, the reverse link power control information associated with controlling transmission power of the second reverse link carrier according to a channel quality of the first forward link.

It is contemplated that the channel quality indicator for the second forward link carrier is received via the first reverse link carrier. It is further contemplated that the channel quality indicator for the second forward link carrier is received via the second reverse link carrier.

It is contemplated that the method further includes receiving another indicator from the mobile terminal at an adjusted power level, the power level adjusted according to a predetermined step size in response to the reverse link power control information. It is further contemplated that the reverse link power control information is determined by comparing a measured signal to noise ratio of the other indicator received from the mobile terminal to a predetermined value, the predetermined value adjusted when at least one of a null rate reverse rate indicator (RRI) is detected, the reverse link power control information is associated with decreasing a power level and a reverse traffic channel received from the mobile terminal is decoded.

In another aspect of the present invention, a method of establishing additional reverse link carriers in a multi-carrier wireless communication system is provided. The method includes establishing a plurality of forward link carriers between a network and a mobile terminal and establishing a plurality of reverse link carriers between the network and mobile terminal, each of plurality of reverse link carrier associated with a corresponding one of the plurality of forward link carriers, wherein at least one of the plurality of forward link carrier provides control data associated with a corresponding one of the plurality of reverse link carriers to at least one non-corresponding of the plurality of reverse link carriers and at least one of the plurality of reverse link carriers provides control data associated with a corresponding one of the plurality of forward link carriers to at least one non-corresponding of the plurality of forward link carriers.

In another aspect of the present invention, a mobile terminal for establishing additional reverse link carriers in a multi-carrier wireless communication system is provided. The mobile terminal includes a transmitting/receiving unit adapted to transmit data to and receive data from a network, a display unit adapted to display user interface information, an input unit adapted to input user data and a processing unit adapted to establish a first communication link with the network by controlling the transmitting/receiving unit to receive data from the network via a first forward link carrier, to control the transmitting/receiving unit to transmit data to the network via a first reverse link carrier, to control the transmitting/receiving unit to receive a traffic channel assignment indicator for a second reverse link carrier via the first forward link carrier and to control the transmitting/receiving unit to receive reverse link power control information for the second reverse link via the first forward link carrier, the reverse link power control information associated with controlling transmission power of the second reverse link carrier according to a channel quality of the first forward link.

It is contemplated that the processing unit is further adapted to control the transmitting/receiving unit to transmit an indicator to the network using an adjusted power level, the power level adjusted according to a predetermined step size in response to the reverse link power control information. It is further contemplated that the processing unit is further adapted to determine an initial transmission power for transmitting the indicator in response to at least one of a reverse link load and a channel correlation estimate between the first reverse link carrier and the second reverse link carrier.

It is contemplated that the indicator includes at least one of a pilot signal and a reverse rate indicator. It is further contemplated that the processing unit is further adapted to control the transmitting/receiving unit to receive a notification signal from the network via one of the first forward link carrier and a second forward link carrier, the notification signal indicating that the network has acquired the second reverse link carrier.

It is contemplated that the notification signal is received in one of a signaling message and a physical layer message. It is further contemplated that the first forward link carrier and the first reverse link carrier comprise a code division multiple access (CDMA) channel.

It is contemplated that the processing unit is further adapted to control the transmitting/receiving unit to receive a power-adjust signal from the network and transmit another indicator at an adjusted power level, the power level adjusted according to a step size that is larger than the predetermined step size. It is further contemplated that the processing unit is further adapted to control the transmitting/receiving unit to communicate packet data via the second reverse link carrier when the reverse link power control information received from the network is associated with decreasing a power level.

It is contemplated that the processing unit is further adapted to control the transmitting/receiving unit to communicate packet data via the second reverse link carrier when an acknowledgement signal is received from the network. It is further contemplated that the processing unit is further adapted to control the transmitting/receiving unit to transmit a channel quality indicator for a second forward link carrier to the network.

It is contemplated that the processing unit is further adapted to control the transmitting/receiving unit to transmit the channel quality indicator for the second forward link carrier via the first reverse link carrier. It is further contemplated that the processing unit is further adapted to control the transmitting/receiving unit to transmit the channel quality indicator for the second forward link carrier via the second reverse link carrier. Preferably, the processing unit is further adapted to control the transmitting/receiving unit to transmit another indicator to the network using an adjusted power level, the power level adjusted according to a predetermined step size in response to the reverse link power control information.

In another aspect of the present invention, a network for establishing additional reverse link carriers in a multi-carrier wireless communication system is provided. The network includes a transmitter adapted to transmit data to a mobile terminal, a receiver adapted to receive data from the mobile terminal and a controller adapted to establish a first communication link with the mobile terminal by controlling the transmitter to transmit data to the mobile terminal via a first forward link carrier and control the receiver to receive data from the mobile terminal via a first reverse link carrier, to control the transmitter to transmit a traffic channel assignment indicator for a second reverse link carrier via the first forward link carrier and control the transmitter to transmit reverse link power control information for the second reverse link via the first forward link carrier, the reverse link power control information associated with controlling transmission power of the second reverse link carrier according to a channel quality of the first forward link.

It is contemplated that the controller is further adapted to control the receiver to receive an indicator from the mobile network, the indicator received at an adjusted power level, the power level adjusted according to a predetermined step size in response to the reverse link power control information. It is further contemplated that the indicator includes at least one of a pilot signal and a reverse rate indicator.

It is contemplated that the controller is further adapted to control the transmitter to transmit a notification signal to the mobile terminal via one of the first forward link carrier and a second forward link carrier, the notification signal indicating that the second reverse link carrier was acquired. It is further contemplated that the notification signal is transmitted in one of a signaling message and a physical layer message.

It is contemplated that the first forward link carrier and the first reverse link carrier comprise a code division multiple access (CDMA) channel. It is further contemplated that the controller is further adapted to control the transmitter to transmit a power-adjust signal to the mobile terminal and control the receiver to receive another indicator at an adjusted power level, the power level adjusted according to a step size that is larger than the predetermined step size.

It is contemplated that the controller is further adapted to control the receiver to receive packet data via the second reverse link carrier when the reverse link power control information transmitted to the mobile terminal is associated with decreasing a power level. It is further contemplated that the controller is further adapted to control the receiver to receive packet data via the second reverse link carrier when an acknowledgement signal is transmitted to the mobile network.

It is contemplated that the controller is further adapted to control the receiver to receive a channel quality indicator for a second forward link carrier from the mobile network. It is further contemplated that the channel quality indicator for the second forward link carrier is received via the first reverse link carrier.

It is contemplated that the channel quality indicator for the second forward link carrier is received via the second reverse link carrier. It is further contemplated that the controller is further adapted to control the receiver to receive another indicator from the mobile network at an adjusted power level, the power level adjusted according to a predetermined step size in response to the reverse link power control information. Preferably, the controller is further adapted to determine the reverse link power control information by comparing a measured signal to noise ratio of the other indicator received from the mobile terminal to a predetermined value, the predetermined value adjusted when at least one of a null rate reverse rate indicator (RRI) is detected, the reverse link power control information is associated with decreasing a power level and a reverse traffic channel received from the mobile network is decoded.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 7 illustrates a comparison of cdma2000 for 1× and 1×EV-DO.

DETAILED DESCRIPTION OF THE PREFERRED EMBODIMENTS

Figure 1:
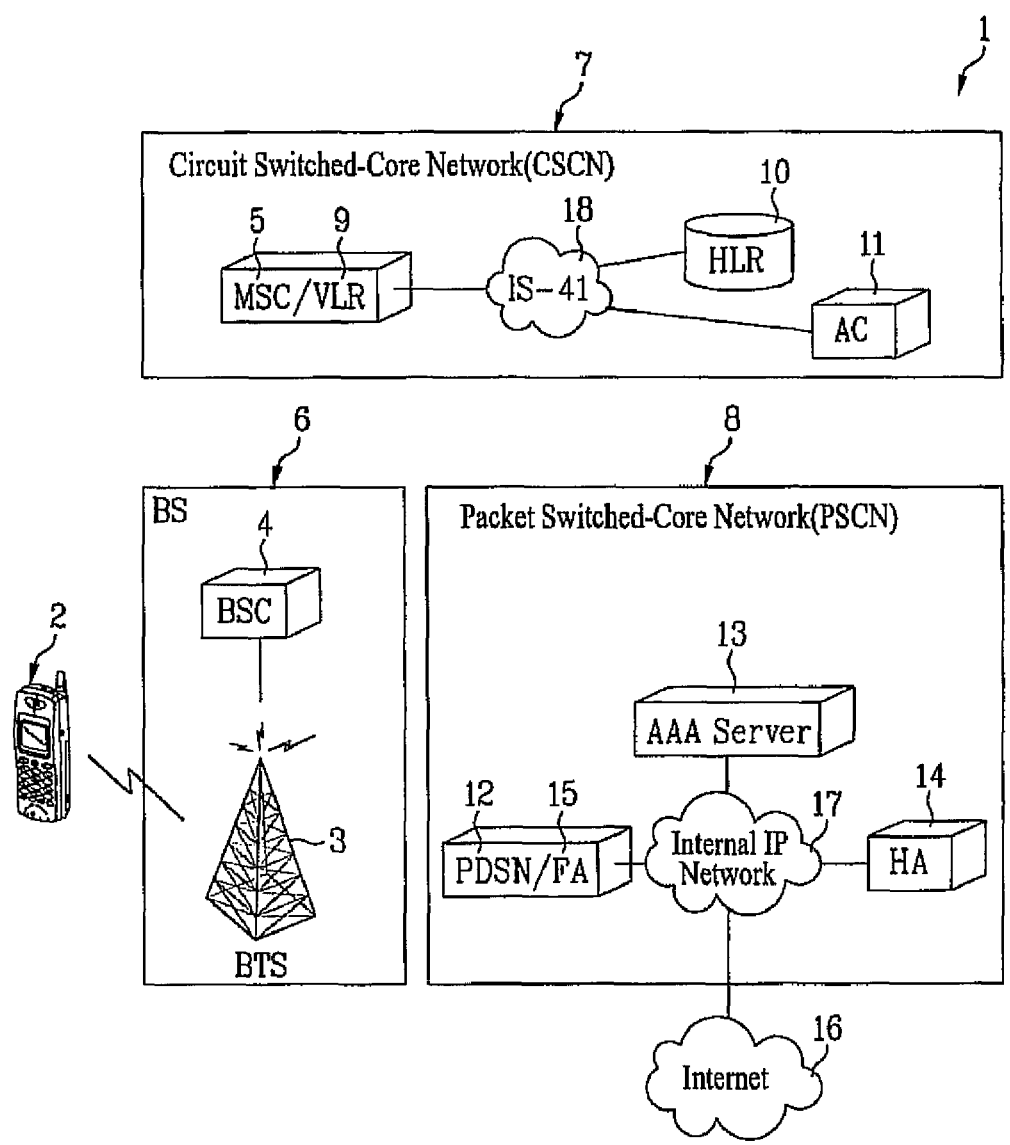
FIG. 1 illustrates wireless communication network architecture.
Figure 2A:
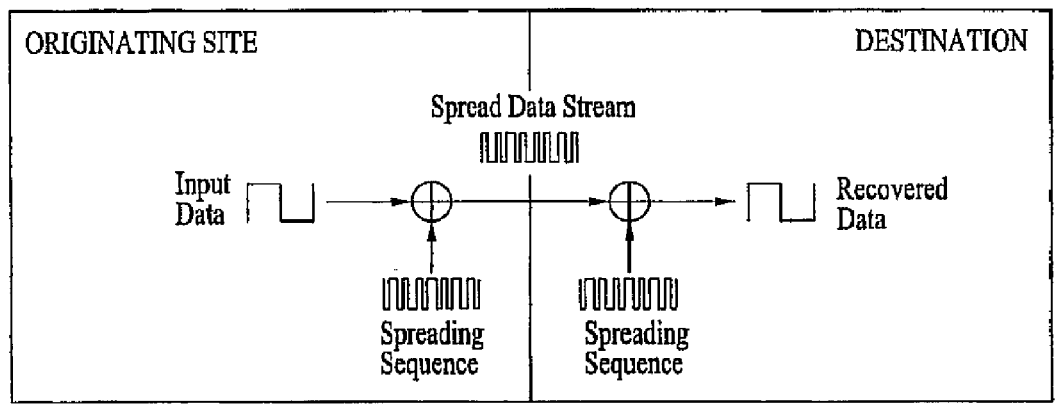
FIG. 2A illustrates a CDMA spreading and de-spreading process.
Figure 2B:
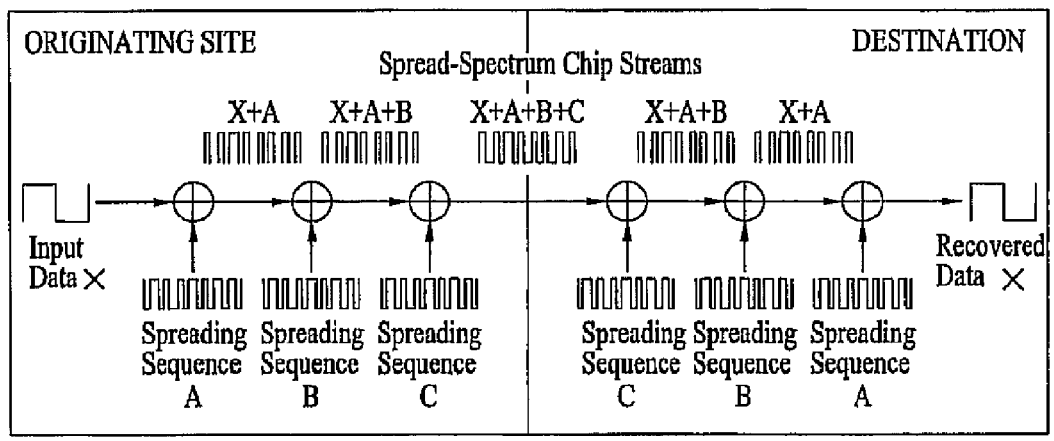
FIG. 2B illustrates a CDMA spreading and de-spreading process using multiple spreading sequences.
Figure 3:
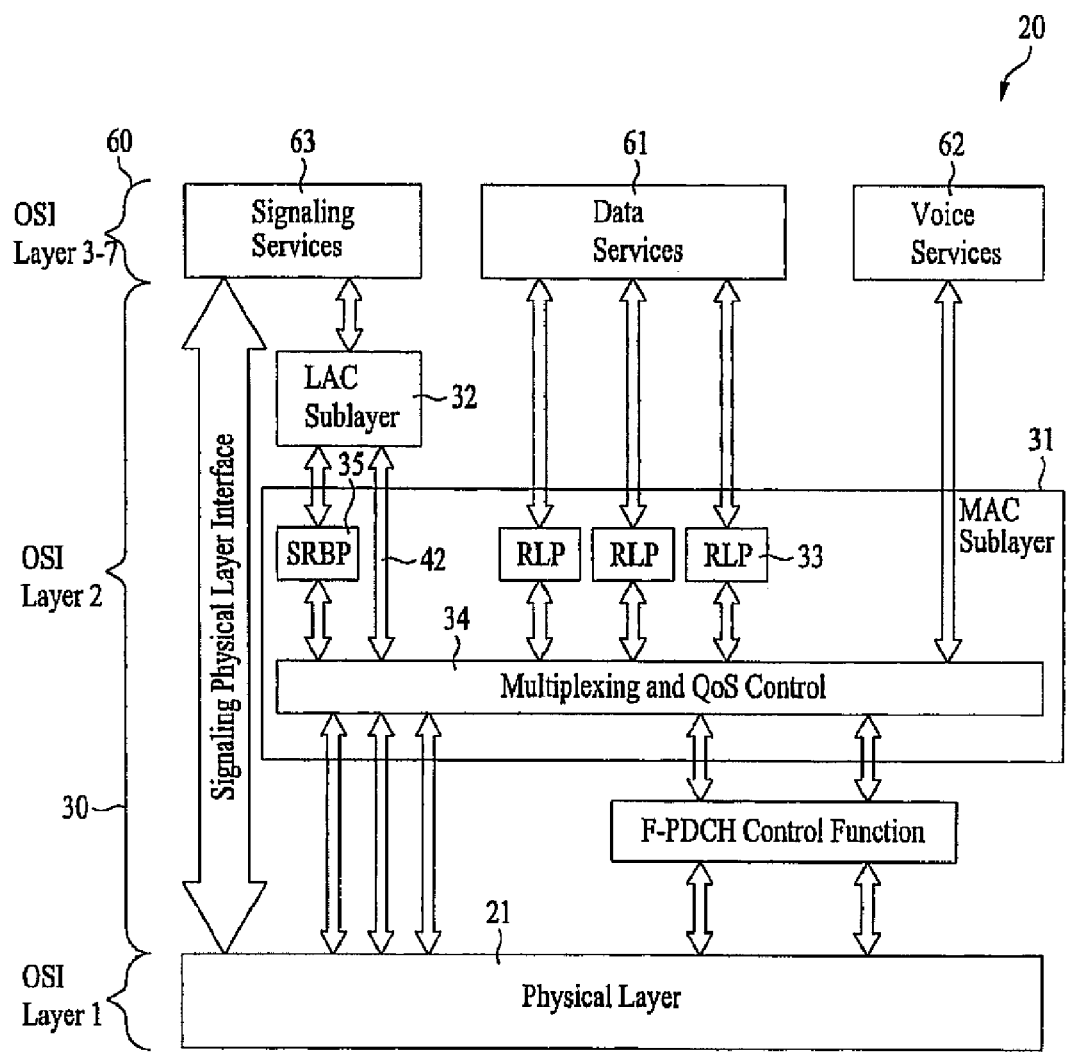
FIG. 3 illustrates a data link protocol architecture layer for a cdma2000 wireless network.
Figure 4:
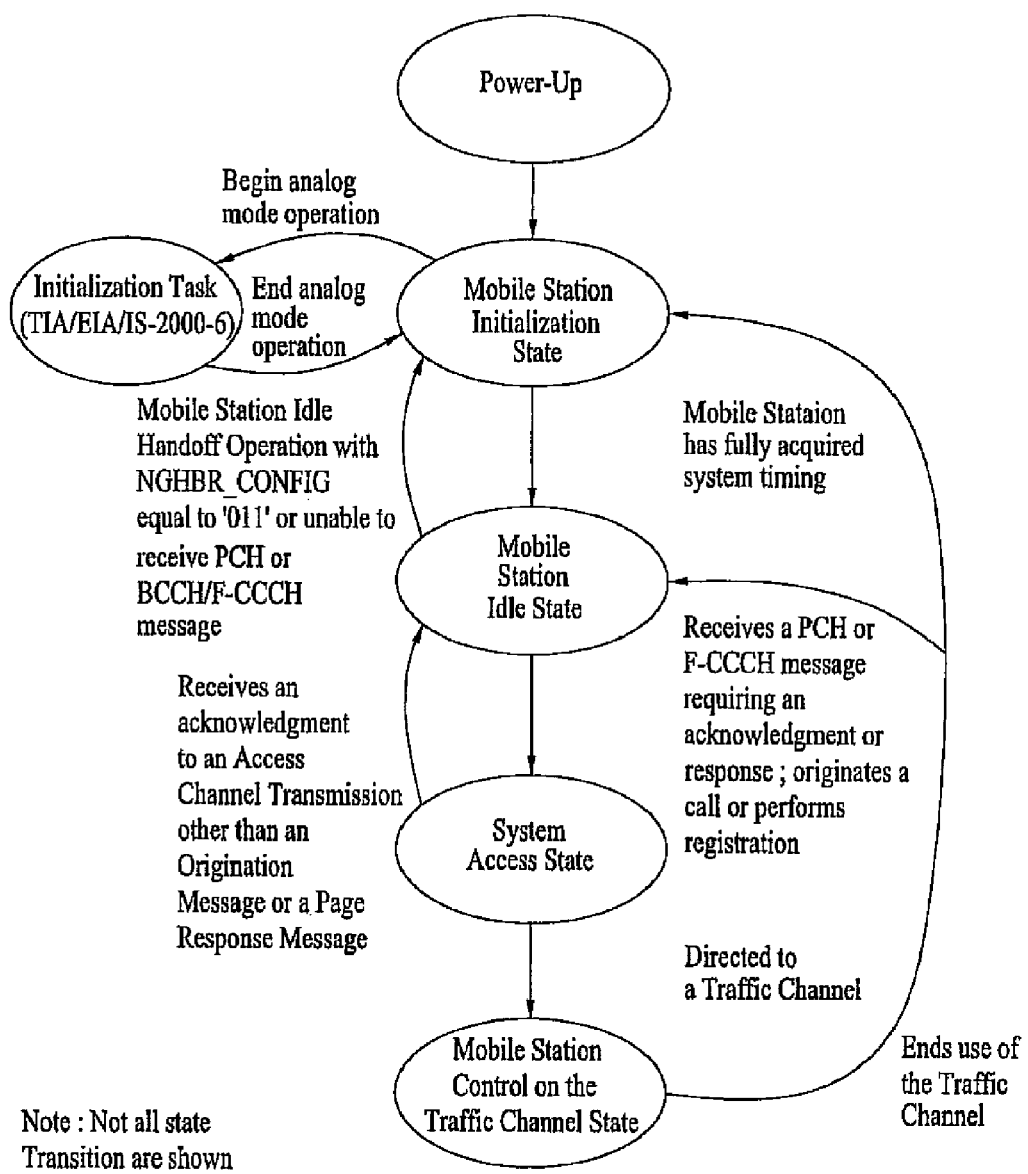
FIG. 4 illustrates cdma2000 call processing.
Figure 5:
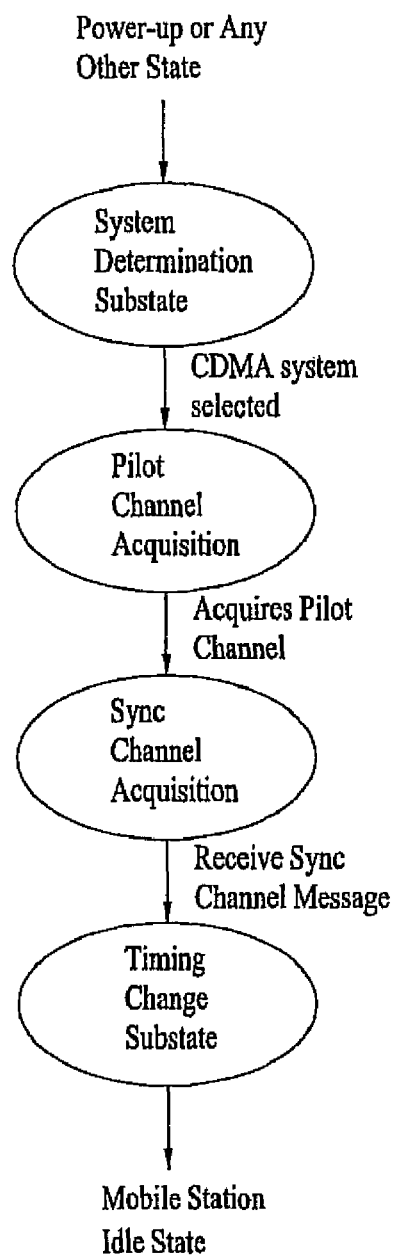
FIG. 5 illustrates the cdma2000 initialization state.
Figure 6:
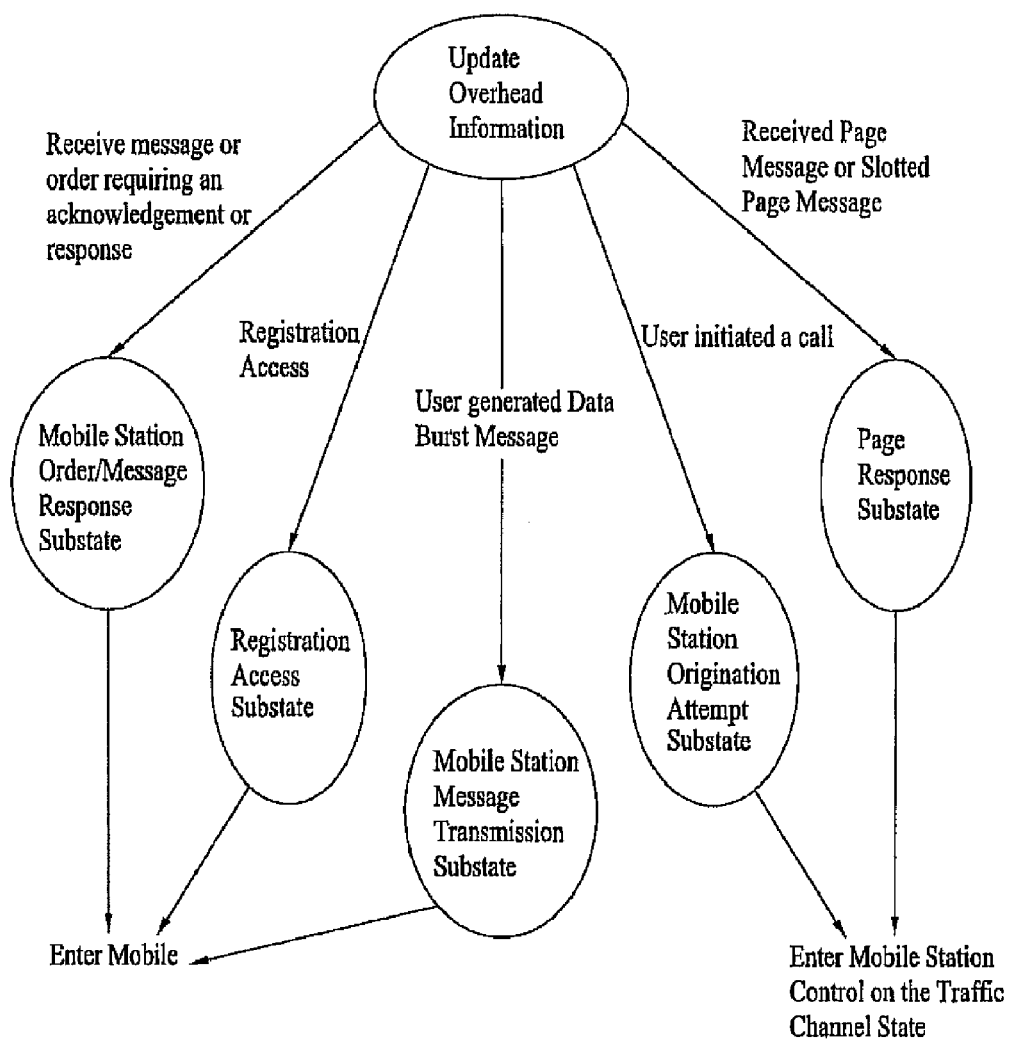
FIG. 6 illustrates the cdma2000 system access state.
Figure 8:
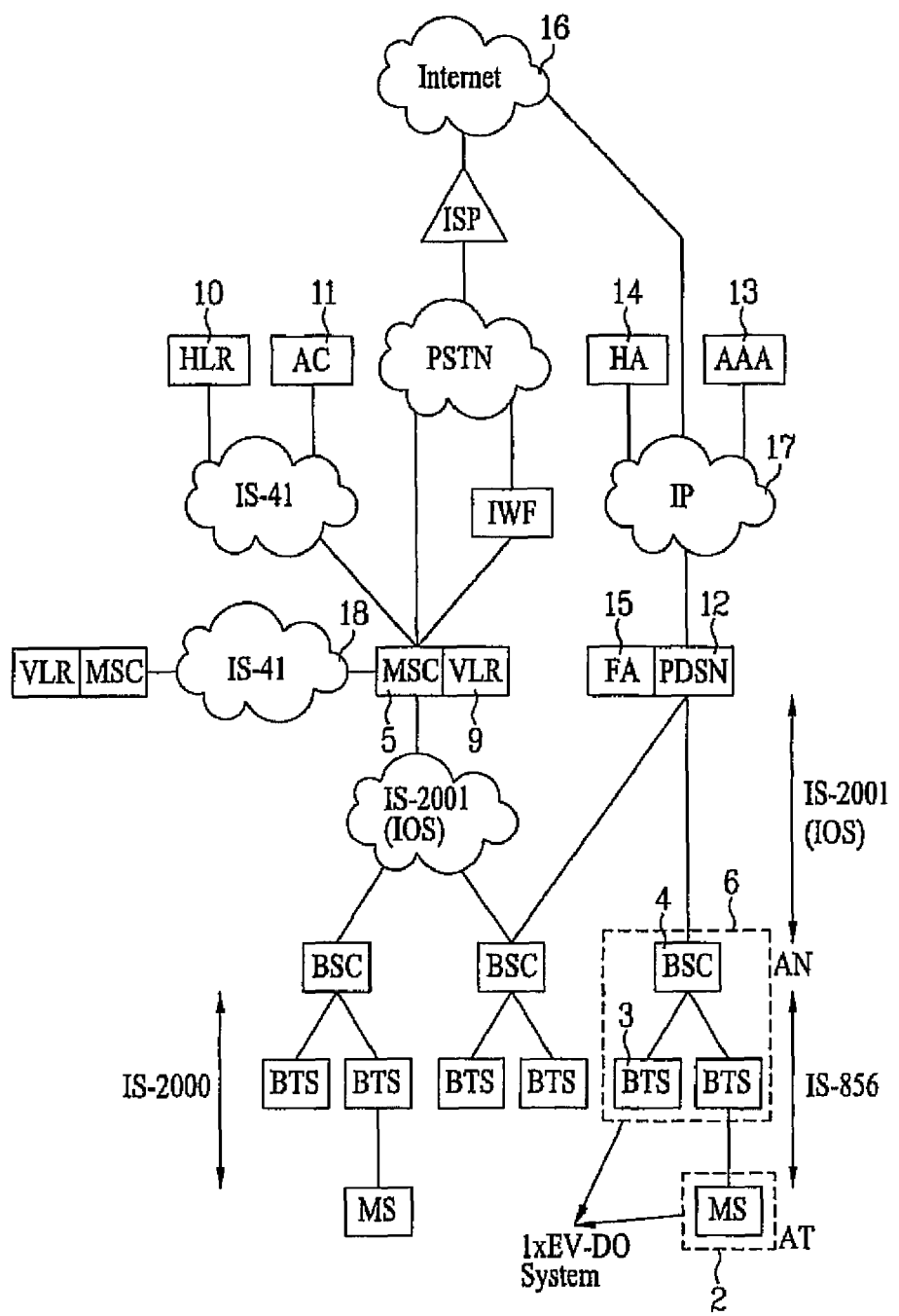
FIG. 8 illustrates a network architecture layer for a 1×EV-DO wireless network.
Figure 9:
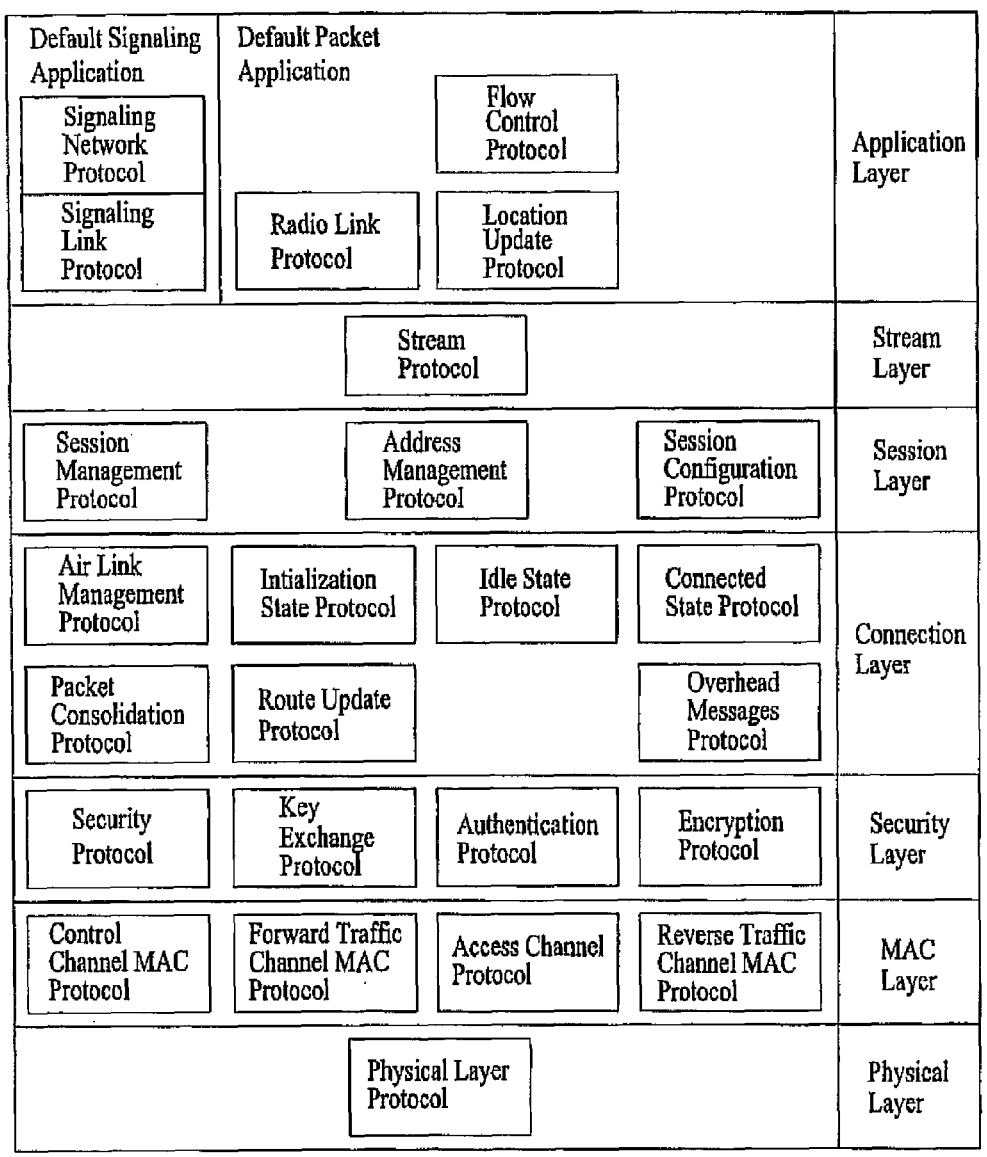
FIG. 9 illustrates 1×EV-DO default protocol architecture.
Figure 10:
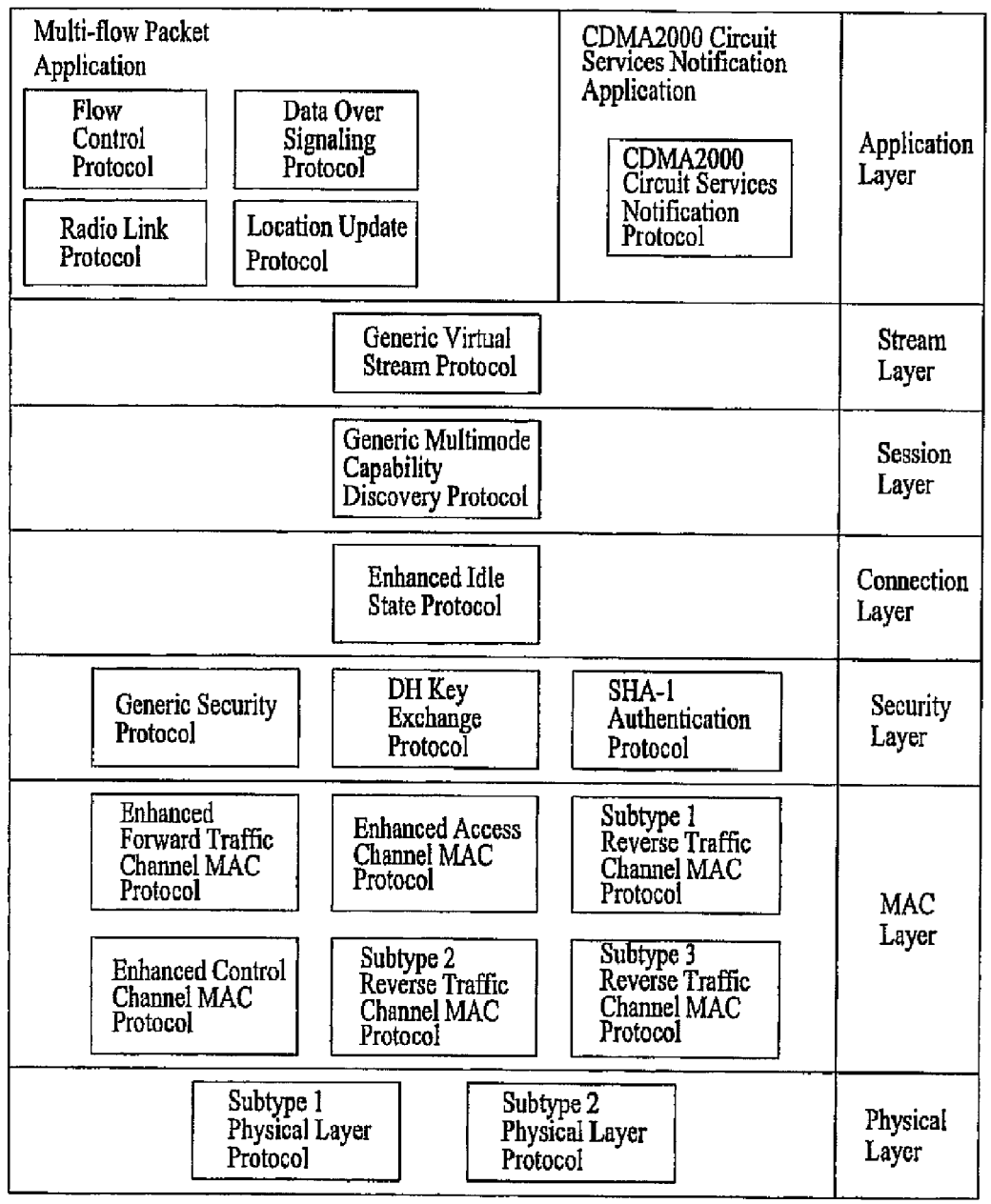
FIG. 10 illustrates 1×EV-DO non-default protocol architecture.
Figure 11:
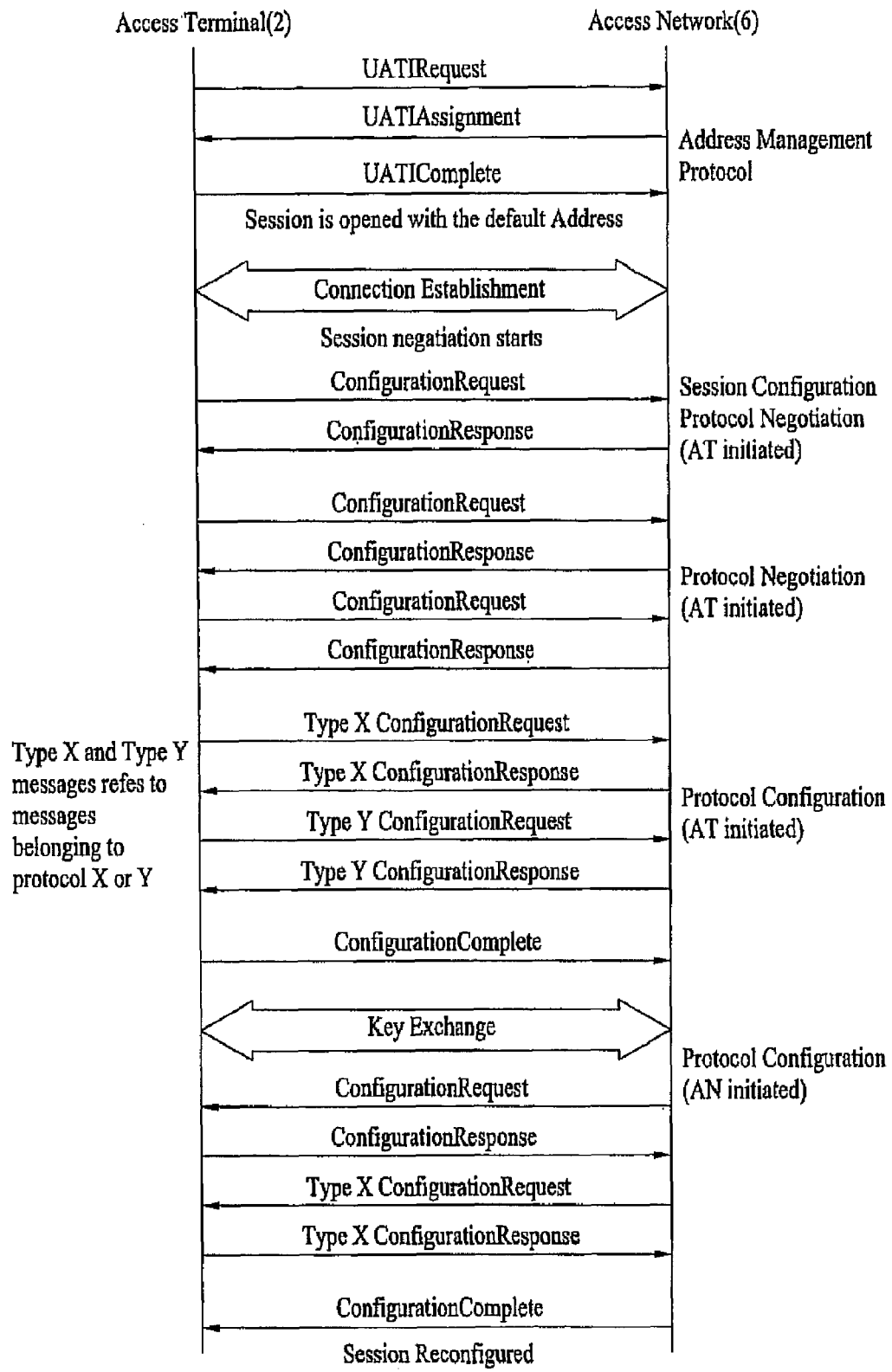
FIG. 11 illustrates 1×EV-DO session establishment.
Figure 12:
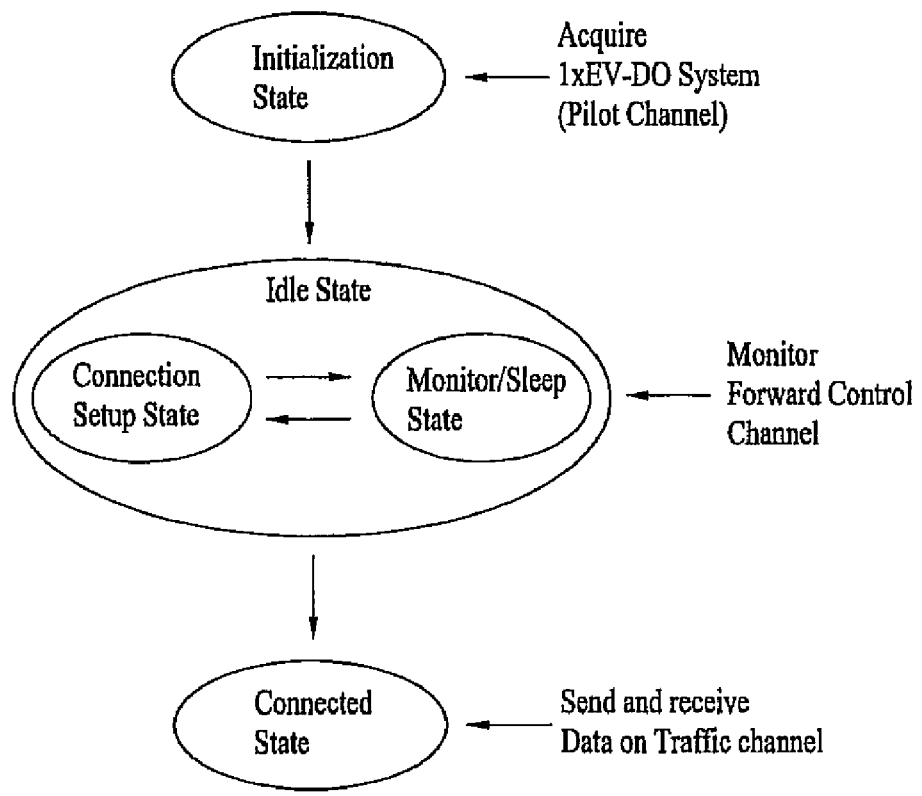
FIG. 12 illustrates 1×EV-DO connection layer protocols.
Figure 13:
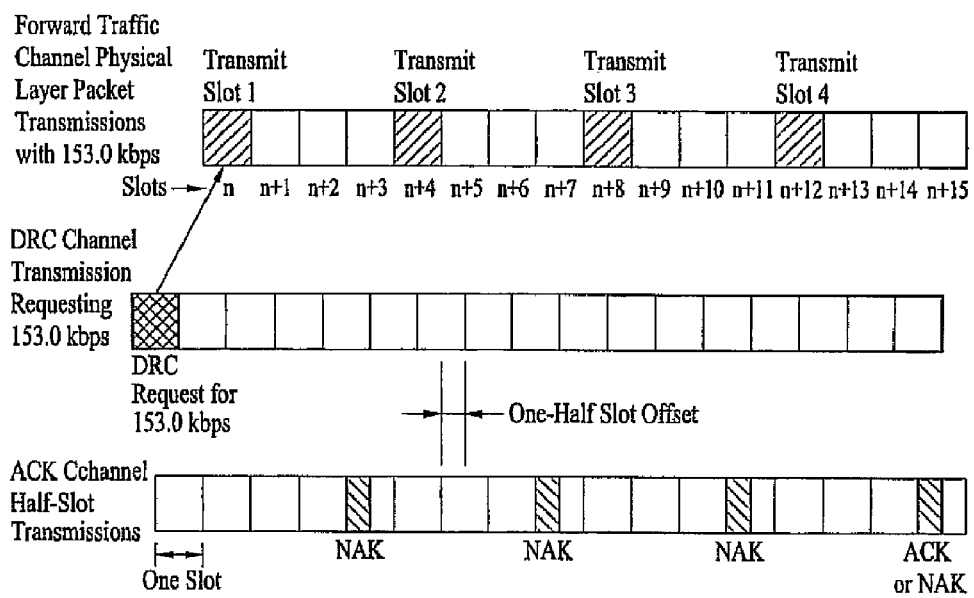
FIG. 13 illustrates 1×EV-DO ACK/NAK operation.
Figure 14:
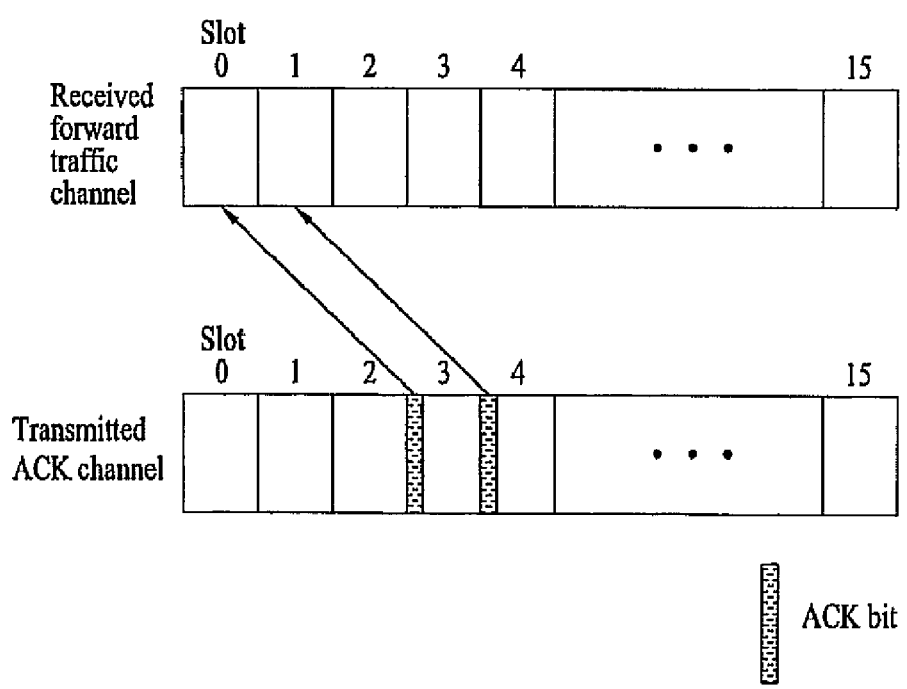
FIG. 14 illustrates the 1×EV-DO reverse link ACK channel.

The present invention relates to a method and apparatus for reliably and quickly establishing multiple reverse links in multi-carrier wireless networks. Although the present invention is illustrated with respect to a mobile terminal, it is contemplated that the present invention may be utilized anytime it is desired to establish multiple reverse links for communication devices in multi-carrier wireless networks.

According to the methods of the present invention, a feedback channel is first established on the forward link (FL). Specifically, signaling channels are established on the FL in order to transmit reverse link (RL) power control (RPC) bits and the RL ACK/NAK indications.

The establishment of a feedback channel on the FL will allow the AN 6 to facilitate the setup of the RL in a reliable and quick fashion. In multi-carrier systems where there already exists at least one RL in operation, the process is more efficient.

Once the feedback channel has been established, the AT 2 must determine the initial transmission power on the new RL carrier. Information available at the AT 2 or some subset of the information may be used. For example, RL load via the reverse activity bit (RAB), which is set by the AN 6, and correlation estimates between existing reverse links and the new RL may be utilized.

The present invention provides a method to establish the feedback channel on the FL. The feedback channel can be a dedicated FL channel used to support the new RL channel.

Although the present invention is described with regard to a two-carrier system with two frequencies, f1 and f2, it will be understood that the present invention may be applied to any multi-carrier system. The methods of the present invention assume that the FL (f1) and RL (f1) have already been established, as in a single-carrier system. The methods of the present invention are directed to establishing the RL on the new carrier f2.

First, the AT 2 measures channel quality information (CQI) or data rate control (DRC) information over FL (f2) using, for example, the pilot signal (f2). The CQI (f2) information is then transmitted to the AN 6 over the existing RL (f1).

Upon reception of the CQI (f2), the AN 6 initiates power control of the RL channel. The AN 6 begins monitoring RL (f2) for the RL signal of the AT 2, such as RL pilot (f2), and estimates its SNR. As in conventional methods, this measured pilot SNR is compared against a threshold SNR, commonly referred to as the inner loop power control set point, which is the reception power level desired by the AN 6 and may be changed according to an error rate.

The inner loop power control set point may be determined in a number of ways. For example, a default value could be used initially that is sufficient to detect the RRI.

Outer loop power control can begin once the null-rate RRI is detected. Outer loop power control may be initiated once the set point is reached and a first DOWN command is sent. Furthermore, Outer loop power control may be initiated once the first RTC is decoded.

The AN 6 transmits the RPC (f2) commands to the AT 2 on the new carrier FL (f2). The power allocated to the RPC (f2), and later the ACK channel, is determined by CQI (f2).

It should be pointed out that measurement of the channel quality information (CQI) or data rate control (DRC) information over FL (f2) by the AT 2 can be pre-empted if the RPC (f2) commands are sent over FL (f1). Furthermore the measurement may be pre-empted if FL (f2) is not active in any way. Moreover, even if FL (f2) is active, a DRC (f2) should already be working and the measurement may still be pre-empted.

Once the RPC (f2) feedback channel has been established, the AT 2 can then begin transmission of the RL (f2) at an initial transmission power (f2). The signal could be, for example, the reverse rate indicator (RRI) channel. The power of the RL signal, such as the Pilot, can then be immediately power controlled by the RPC (f2) feedback.

The AT 2 knows when to begin RTC transmission based on a response from the AN 6. The AN 6 may send an upper layer RTC ACK message over the existing FL already established, such as on primary or even a new FL carrier. The AN 6 may send a PHY layer ACK.

The PHY layer ACK may be triggered by monitoring the RRI, which could be defined as the null-rate for initial transmission until the ACK is sent, or preferably by monitoring the pilot power and when the first DOWN command of RPC is sent. Errors in any of the detections, such as RRI detection and ACK/NAK detection, must be checked.

The methods of the present invention provide for improved reliability and speed of the new RL carrier set up.

If the ACK channel is not used as described, then the AN 6 and AT 2 may use the additional feedback channel, such as the ACK/NAK channel (f2). Initially, if the AT 2 receives a NAK, the AT can decide to boost the transmission power further.

For example, if a NAK (f2) is received, the AT 2 increases power using a larger step size, such as 2 dB. This operation could stop after the AT 2 receives the first ACK. Alternately, the RPC (f2) commands can initially use a larger step size, such as 2 dB, until the first ACK is received by the AT 2 from the AN 6

The AT 2 could initially send only the RL pilot (f2). Regular operation could start once the first RPC (f2) DOWN command is received.

The AT 2 could send a "pseudo-probe" over the RL traffic on all RL interlaces, or parallel ARQ channels. For N×EV-DO, this pseudo-probe could be the RRI. This would help establish the set point more quickly.

Before beginning packet transmissions, it may be ensured that the RTC is stable. The stable state may be defined as when the first DOWN command and/or first ACK is sent. The ACK could also be used, at least initially, to indicate the stable state.

According to the present invention a RPC channel is established first before transmission on the new RL. An RPC channel of new RL is established on the paired FL carrier. Alternately, an RPC channel of new RL may be established on FL anchor carrier.

Figure 15A:
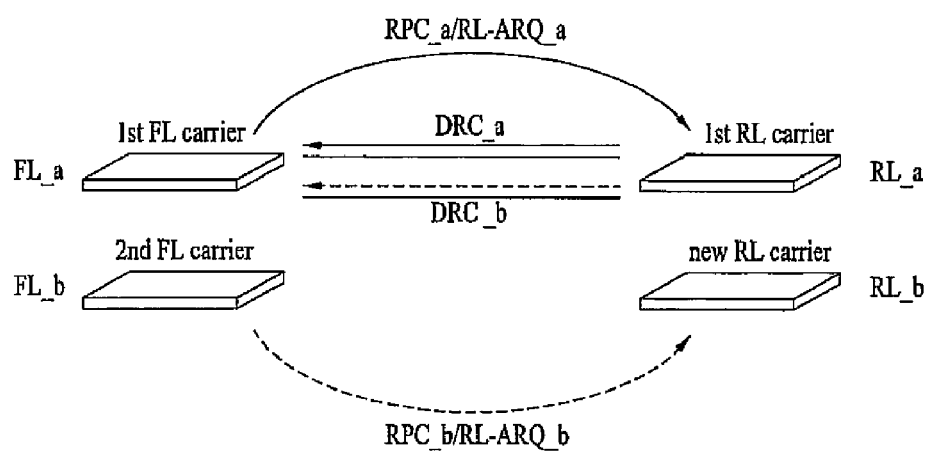
FIGS. 15A and 15B illustrate a method for establishing multiple reverse links according to one embodiment of the present invention.
Figure 15B:
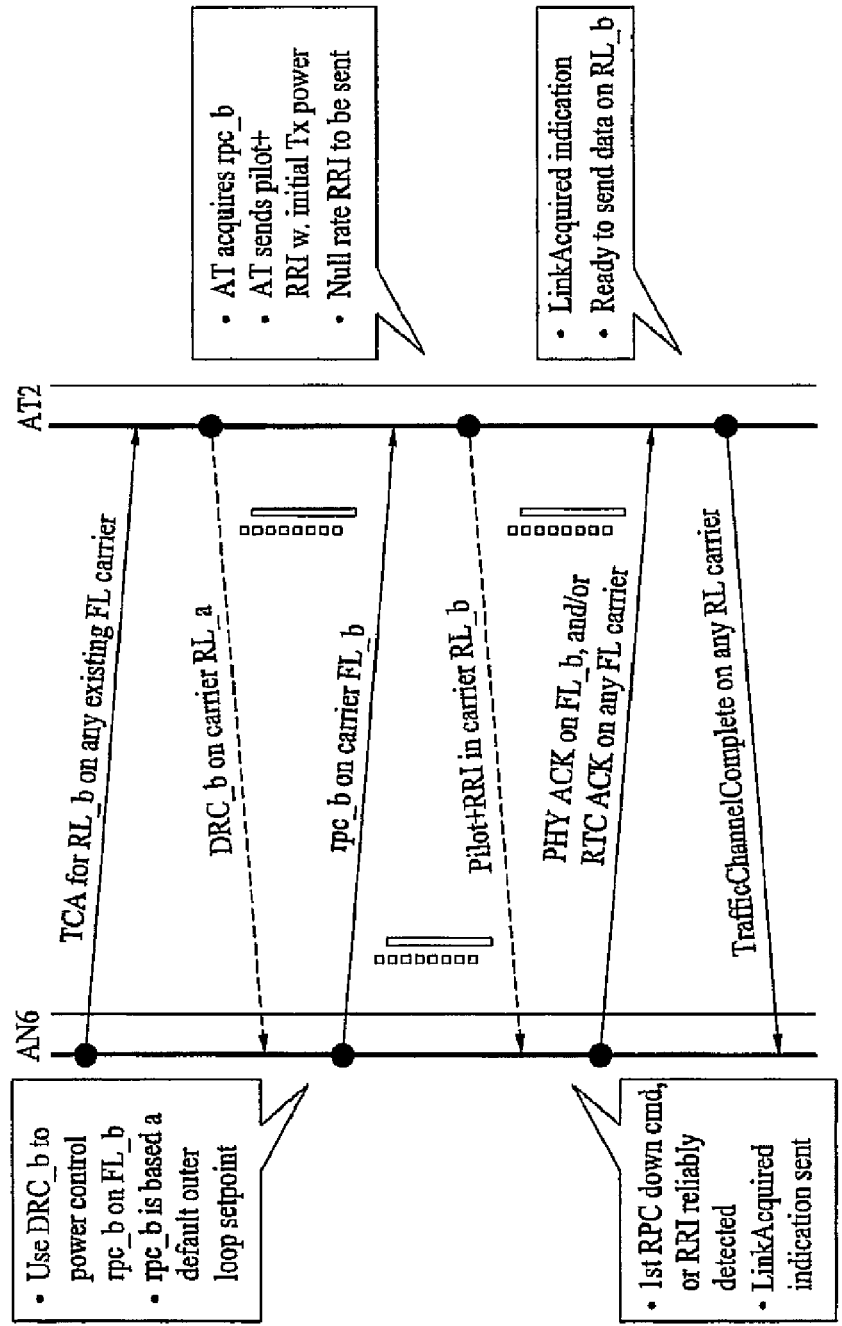
Figure 16A:
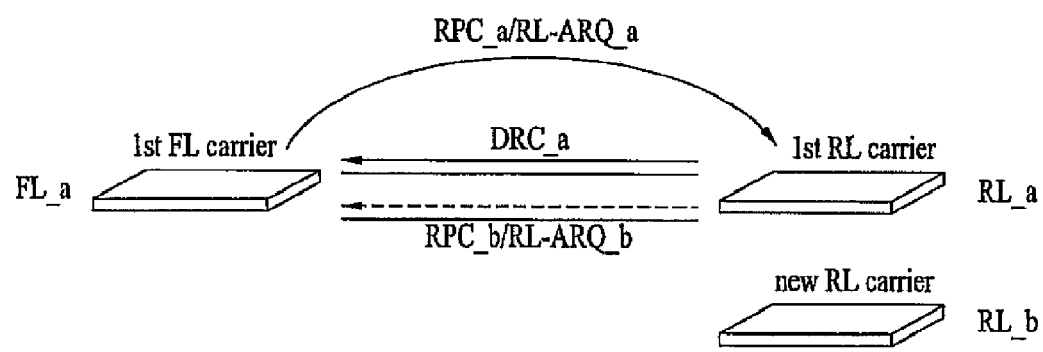
FIGS. 16A and 16B illustrate a method for establishing multiple reverse links according to another embodiment of the present invention according to one embodiment of the present invention.
Figure 16B:
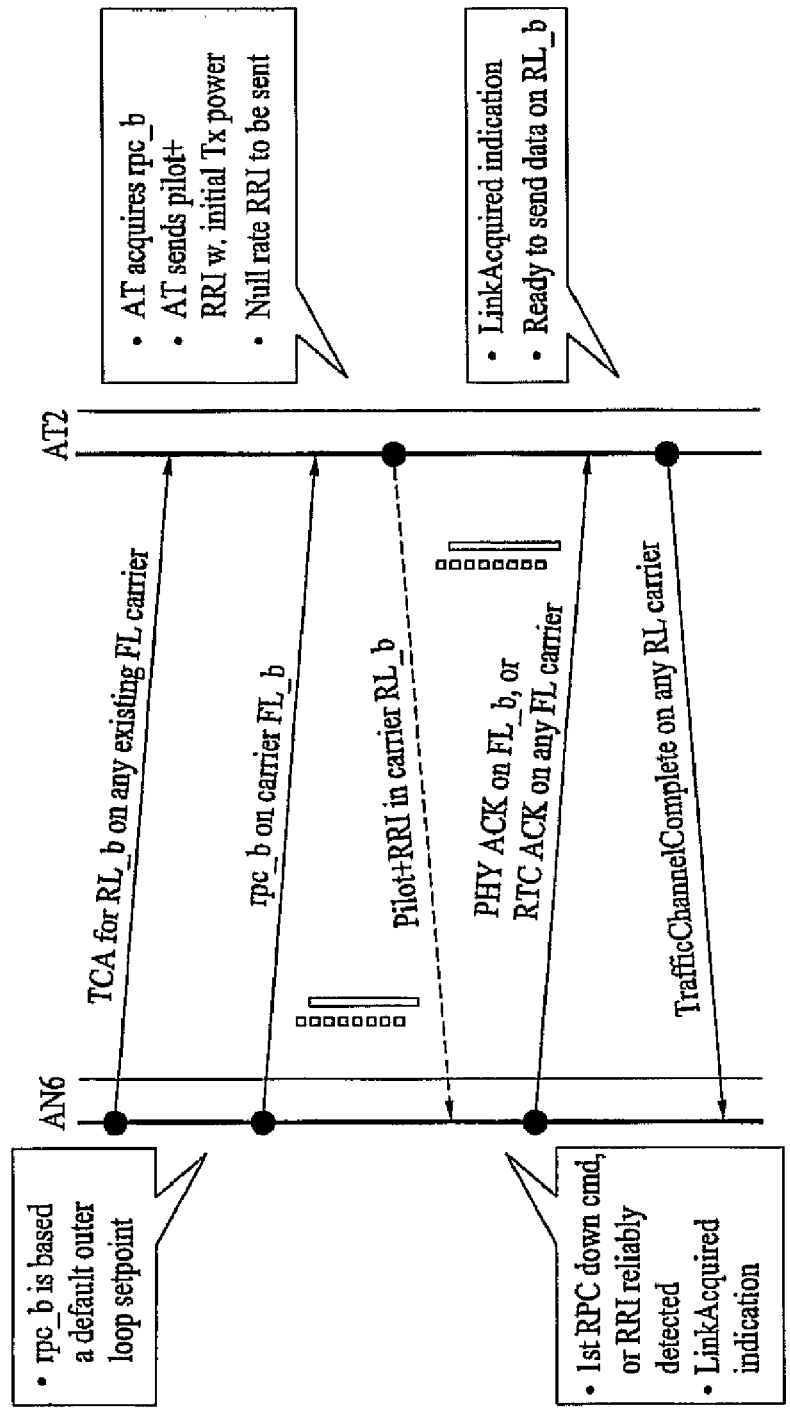

FIGS. 15A and 15B illustrate a first method according to the present invention. FIGS. 16A and 16B illustrate a second method according to the present invention.

As illustrated in FIGS. 15A and 15B, the AT 2 measures channel quality information of the new FL_b. DRC_b is then transmitted to the AN 6 over the existing RL_a. The AN 6 then transmits the RPC_b commands to the AT 2 on the new carrier FL_b.

As illustrated in FIGS. 16A and 16B, the AN 6 transmits the RPC_b commands to the AT 2 on the existing carrier FL_a. There is no need to measure channel quality information of the new FL_b or to transmit DRC_b to the AN 6.

As illustrated in FIGS. 15A and 15B and 16A and 16B, once the RPC_b feedback channel has been established, the AT 2 can then begin transmission of the RL_b pilot and RRI at an initial transmission power (b). The 1st down command by rpc_b or RRI on RL_b is then correctly detected. The AN 6 may use the RRI error to adjust the outer loop set point for rpc_b. Either PHY ACK on FL_b or RTCACK is used to indicate acquisition of RL_b to the AT 2.

Figure 17:
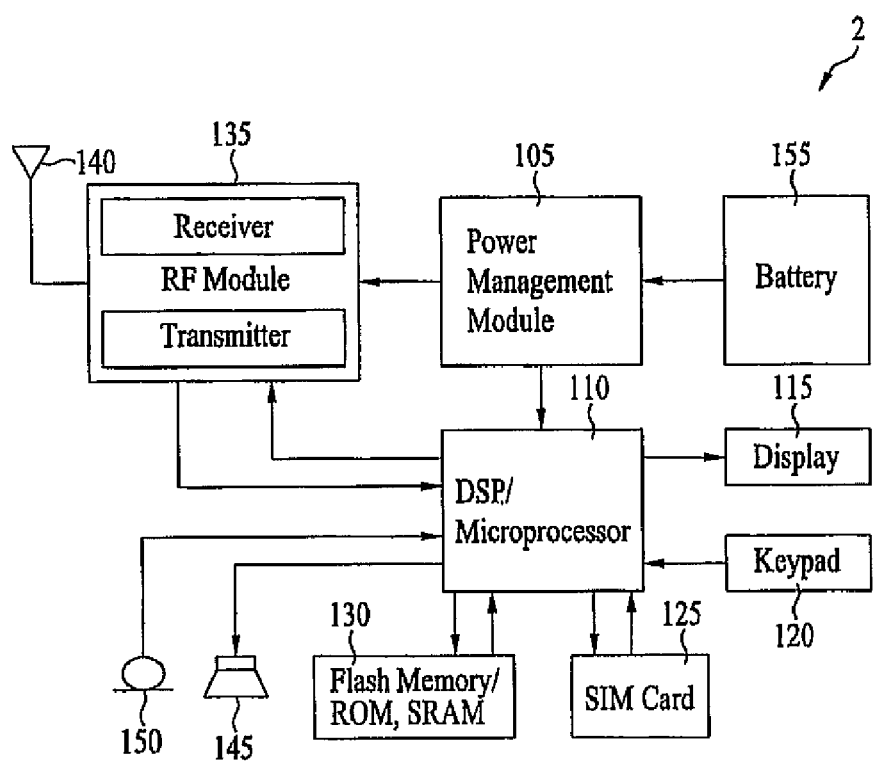
FIG. 17 illustrates a block diagram of a mobile station or access terminal according to one embodiment of the present invention.

FIG. 17 illustrates a block diagram of a mobile station (MS) or access terminal 100 according to one embodiment of the present invention. The AT 100 includes a processor (or digital signal processor) 110, RF module 135, power management module 105, antenna 140, battery 155, display 115, keypad 120, memory 130, SIM card 125 (which may be optional), speaker 145 and microphone 150.

A user enters instructional information, such as a telephone number, for example, by pushing the buttons of a keypad 120 or by voice activation using the microphone 150. The microprocessor 110 receives and processes the instructional information to perform the appropriate function, such as to dial the telephone number. Operational data may be retrieved from the Subscriber Identity Module (SIM) card 125 or the memory module 130 to perform the function. Furthermore, the processor 110 may display the instructional and operational information on the display 115 for the user's reference and convenience.

The processor 110 issues instructional information to the RF module 135, to initiate communication, for example, by transmitting radio signals comprising voice communication data. The RF module 135 includes a receiver and a transmitter to receive and transmit radio signals. An antenna 140 facilitates the transmission and reception of radio signals. Upon receiving radio signals, the RF module 135 may forward and convert the signals to baseband frequency for processing by the processor 110. The processed signals would be transformed into audible or readable information outputted via the speaker 145, for example. The processor 110 also includes the protocols and functions necessary to perform the various processes described herein with regard to cdma2000 or 1×EV-DO systems.

The processor 110 is adapted to perform the methods disclosed herein for establishing multiple reverse links in multi-carrier wireless networks. The processor generates and controls the RF module 135 to transmit DRC_b and RPC_b and to receive FL_a and FL_b as illustrated in FIGS. 15A, 15B, 16A and 16B.

Although the present invention is described with reference to cdma2000, 1×EV-DO and cdma2000 N×EV-DO, it may also be applied to other applicable communication systems.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of receiving control information at a mobile station (MS) in a multi-carrier wireless communication system, the method comprising:
    establishing multiple forward link carriers between the MS and a base station (BS),
        wherein each of the multiple forward link carriers is separated from each other in a frequency domain;
    establishing multiple reverse link carriers between the MS and the BS,
        wherein each of the multiple reverse link carriers is associated with a respective one of the multiple forward link carriers, and separated from each other in the frequency domain;
    receiving first control information for a first reverse link carrier of the multiple reverse link carriers; and
    receiving second control information for a second reverse link carrier of the multiple reverse link carriers, the second control information for the second reverse link carrier being different from the first control information for the first reverse link carrier,
    wherein the first control information for the first reverse link carrier and the second control information for the second reverse link carrier are received from the BS via a common forward link carrier of the multiple forward link carriers between the MS and the BS.

2. The method of claim 1, wherein the first control information and the second control information comprises power control information.

3. A method of transmitting control information at a base station (BS) in a multi-carrier wireless communication system, the method comprising:
    establishing multiple forward link carriers between a mobile station (MS) and the base station (BS),
        wherein each of the multiple forward link carriers is separated from each other in a frequency domain;
    establishing multiple reverse link carriers between the MS and the BS,
        wherein each of the multiple reverse link carriers is associated with a respective one of the multiple forward link carriers, and separated from each other in the frequency domain;
    transmitting first control information for a first reverse link carrier of the multiple reverse link carriers; and
    transmitting second control information for a second reverse link carrier of the multiple reverse link carriers, the second control information for the second reverse link carrier being different from the first control information for the first reverse link carrier, wherein the first control information for the first reverse link carrier and the second control information for the second reverse link carrier are transmitted to the MS via a common forward link carrier of the multiple forward link carriers between the MS and the BS.

4. The method of claim 3, wherein the first control information and the second control information comprises power control information.

5. A mobile station (MS) used in a multi-carrier wireless communication system, the MS comprising:
   a radio frequency unit; and
   a processor configured to:
      establish multiple forward link carriers between the MS and a base station (BS),
         wherein each of the multiple forward link carriers is separated from each other in a frequency domain;
      establish multiple reverse link carriers between the MS and the BS,
         wherein each of the multiple reverse link carriers is associated with a respective one of the multiple forward link carriers, and separated from each other in the frequency domain;
      receive first control information for a first reverse link carrier of the multiple reverse link carriers; and
      receive second control information for a second reverse link carrier of the multiple reverse link carriers, the second control information for the second reverse link carrier being different from the first control information for the first reverse link carrier,
      wherein the first control information for the first reverse link carrier and the second control information for the second reverse link carrier are received from the BS via a common forward link carrier of the multiple forward link carriers between the MS and the BS.

6. The MS of claim 5, wherein the first control information and the second control information comprises power control information.

7. A base station (BS) used in a multi-carrier wireless communication system, the BS comprising:
   a radio frequency unit; and
   a processor configured to:
      establish multiple forward link carriers between a mobile station (MS) and the base station (BS),
         wherein each of the multiple forward link carriers is separated from each other in a frequency domain;
      establish multiple reverse link carriers between the MS and the BS,
         wherein each of the multiple reverse link carriers is associated with a respective one of the multiple forward link carriers, and separated from each other in the frequency domain;
      transmit first control information for a first reverse link carrier of the multiple reverse link carriers; and
      transmit second control information for a second reverse link carrier of the multiple reverse link carriers, the second control information for the second reverse link carrier being different from the first control information for the first reverse link carrier,
      wherein the first control information for the first reverse link carrier and the second control information for the second reverse link carrier are transmitted to the MS via a common forward link carrier of the multiple forward link carriers between the MS and the BS.

8. The BS of claim 7, wherein the first control information and the second control information comprises power control information.

* * * * *